US012179684B2

(12) United States Patent
Ohno et al.

(10) Patent No.: US 12,179,684 B2
(45) Date of Patent: Dec. 31, 2024

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/374,013

(22) Filed: Sep. 28, 2023

(65) Prior Publication Data

US 2024/0123936 A1   Apr. 18, 2024

(30) Foreign Application Priority Data

Oct. 14, 2022   (JP) .................................. 2022-165752

(51) Int. Cl.
*B60R 21/207*   (2006.01)
*B60R 21/231*   (2011.01)
(Continued)

(52) U.S. Cl.
CPC .......... *B60R 21/207* (2013.01); *B60R 21/231* (2013.01); *B60R 21/233* (2013.01);
(Continued)

(58) Field of Classification Search
CPC . B60R 21/207; B60R 21/233; B60R 21/2338; B60R 21/231; B60R 21/23138;
(Continued)

(56) References Cited

U.S. PATENT DOCUMENTS

2017/0028955 A1 *   2/2017   Ohno ..................... B60R 21/233
2017/0136977 A1 *   5/2017   Ohno ..................... B60R 21/264
(Continued)

FOREIGN PATENT DOCUMENTS

DE   102018104392 A1 *   8/2019   ....... B60R 21/23138
JP      2017030679 A   *   2/2017
(Continued)

*Primary Examiner* — Keith J Frisby
(74) *Attorney, Agent, or Firm* — Dinsmore & Shohl LLP

(57) ABSTRACT

An airbag device has an airbag. The airbag has a front-rear chamber and an airbag main body. The front-rear chamber has a left and right pair of front-rear extending portions that pass by respective left and right sides of a head of a passenger and inflate and deploy toward the seat front side, and a connecting portion connecting front end portions of the pair of front-rear extending portions in a seat left-right direction. Gas is supplied to the airbag main body via a communication hole positioned at a seat rear side of the connecting portion of the front-rear chamber that has inflated and deployed. Owing to inflation and deployment of the front-rear chamber, the airbag main body passes through a gap between a ceiling of the vehicle and the head from the seat rear side toward the seat front side, and thereafter, inflates and deploys toward the seat rear side.

19 Claims, 20 Drawing Sheets

(51) Int. Cl.
  *B60R 21/233* (2006.01)
  *B60R 21/2338* (2011.01)
  *B60R 21/237* (2006.01)
  *B60R 21/00* (2006.01)
(52) U.S. Cl.
  CPC ........ B60R 21/2338 (2013.01); B60R 21/237 (2013.01); *B60R 2021/0048* (2013.01); *B60R 2021/2078* (2013.01); *B60R 2021/23146* (2013.01); *B60R 2021/23153* (2013.01); *B60R 2021/23308* (2013.01); *B60R 2021/23386* (2013.01)
(58) Field of Classification Search
  CPC ........ B60R 21/237; B60R 2021/23386; B60R 2021/0048; B60R 2021/2078; B60R 2021/23161; B60R 2021/23146; B60R 2021/23308; B60R 2021/23153

USPC ............ 280/728.1, 729, 730.1, 730.2, 743.1, 280/743.2
See application file for complete search history.

(56) References Cited

U.S. PATENT DOCUMENTS

| | | | |
|---|---|---|---|
| 2017/0158155 A1* | 6/2017 | Ohno | ............... B60R 21/237 |
| 2019/0016293 A1 | 1/2019 | Saso | |
| 2021/0261079 A1* | 8/2021 | Hagg | ............... B60R 21/231 |
| 2023/0339422 A1* | 10/2023 | Ohno | ............... B60R 21/233 |

FOREIGN PATENT DOCUMENTS

| | | | |
|---|---|---|---|
| JP | 2017030680 A | * | 2/2017 |
| JP | 2019-018593 A | | 2/2019 |
| JP | 6605915 B2 | * | 11/2019 |
| JP | 2019-218013 A | | 12/2019 |
| JP | 2019-218014 A | | 12/2019 |

* cited by examiner

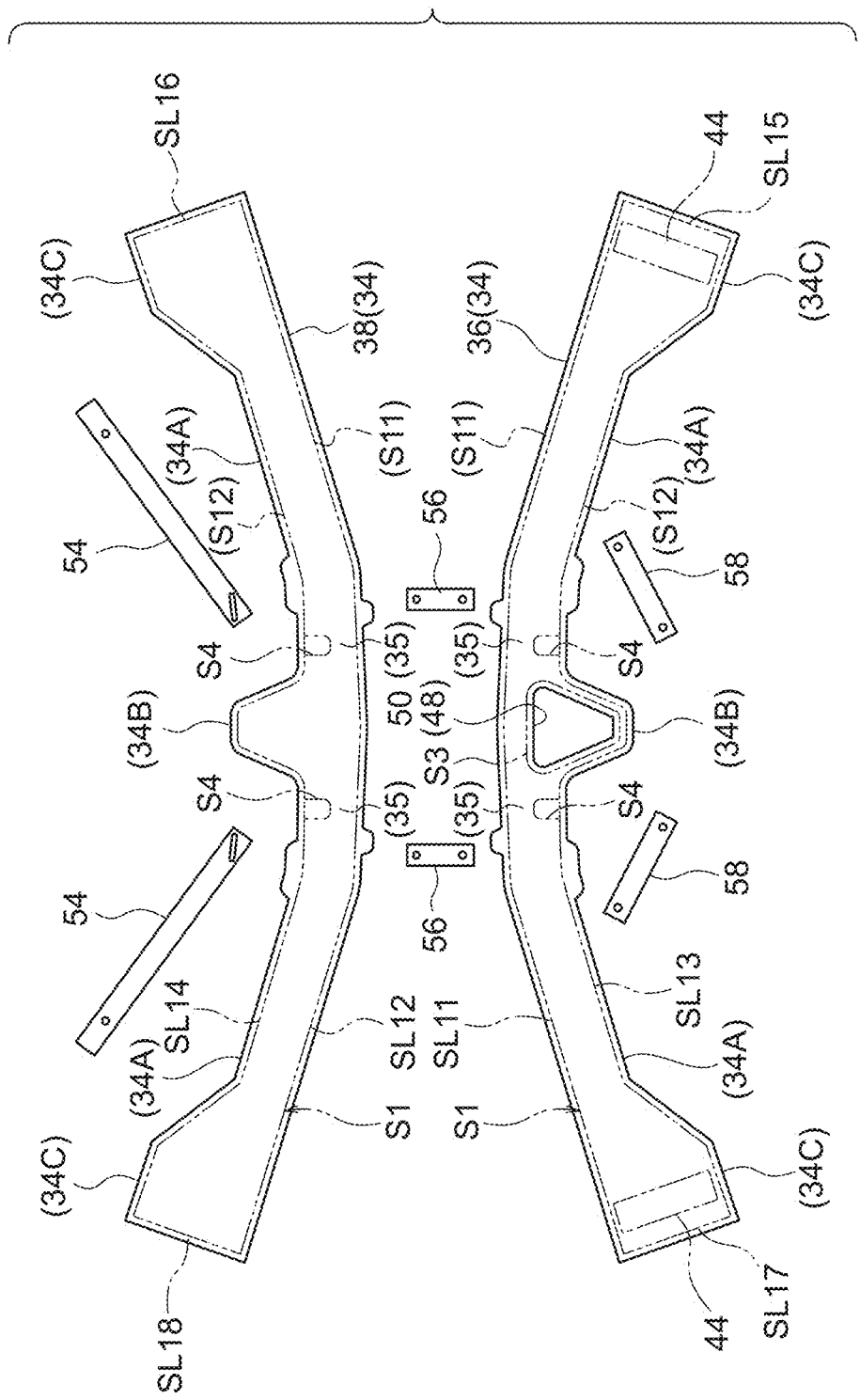

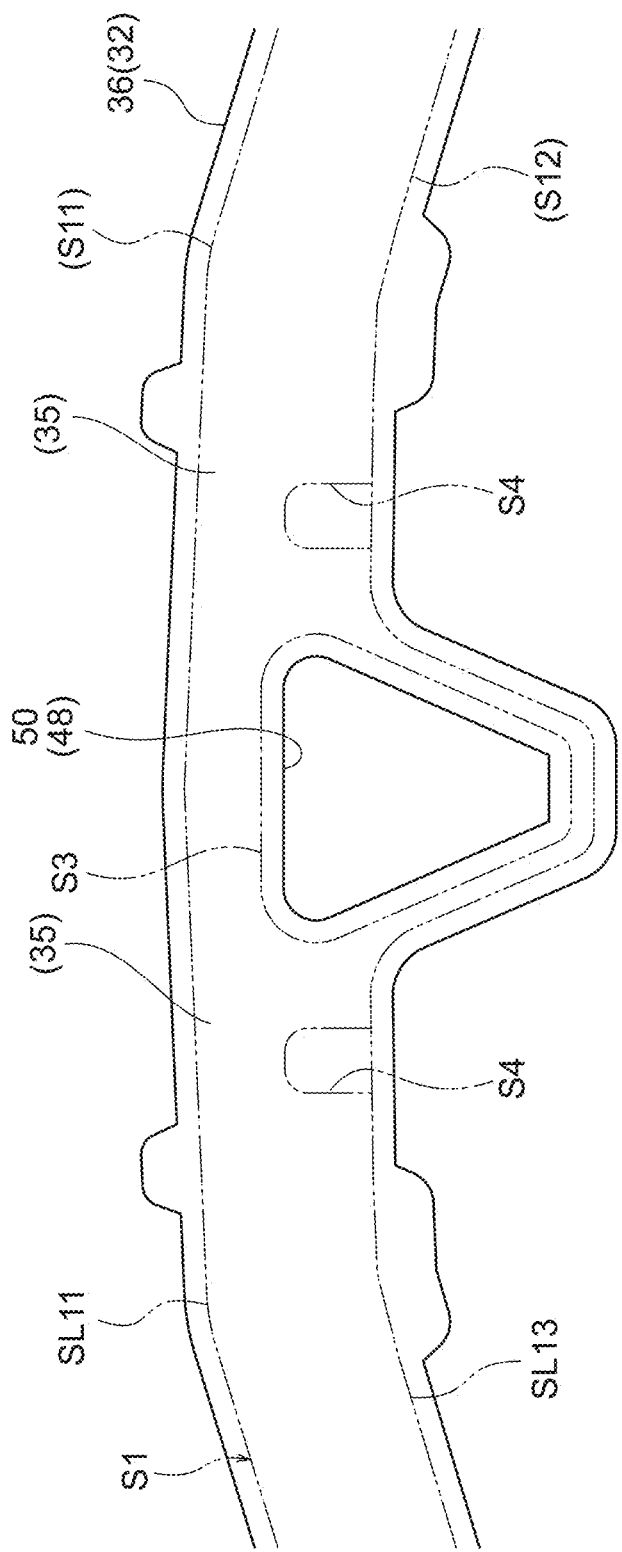

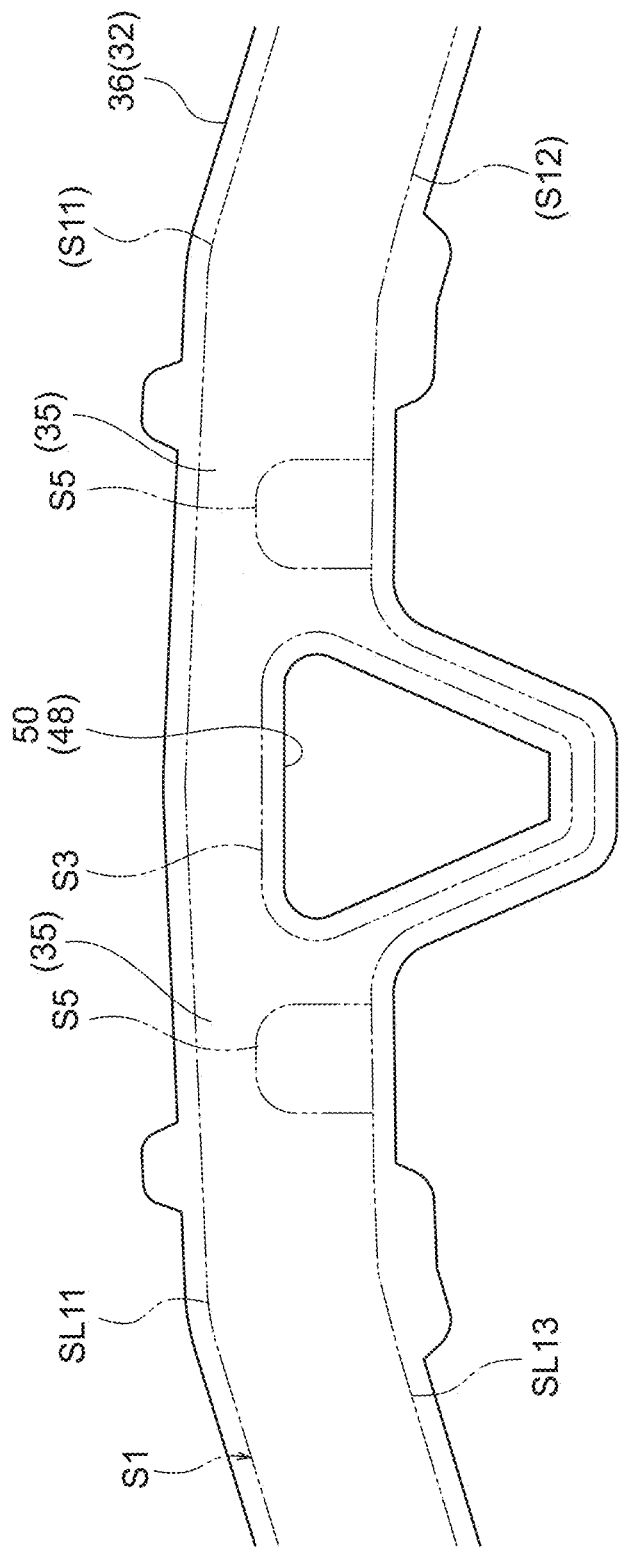

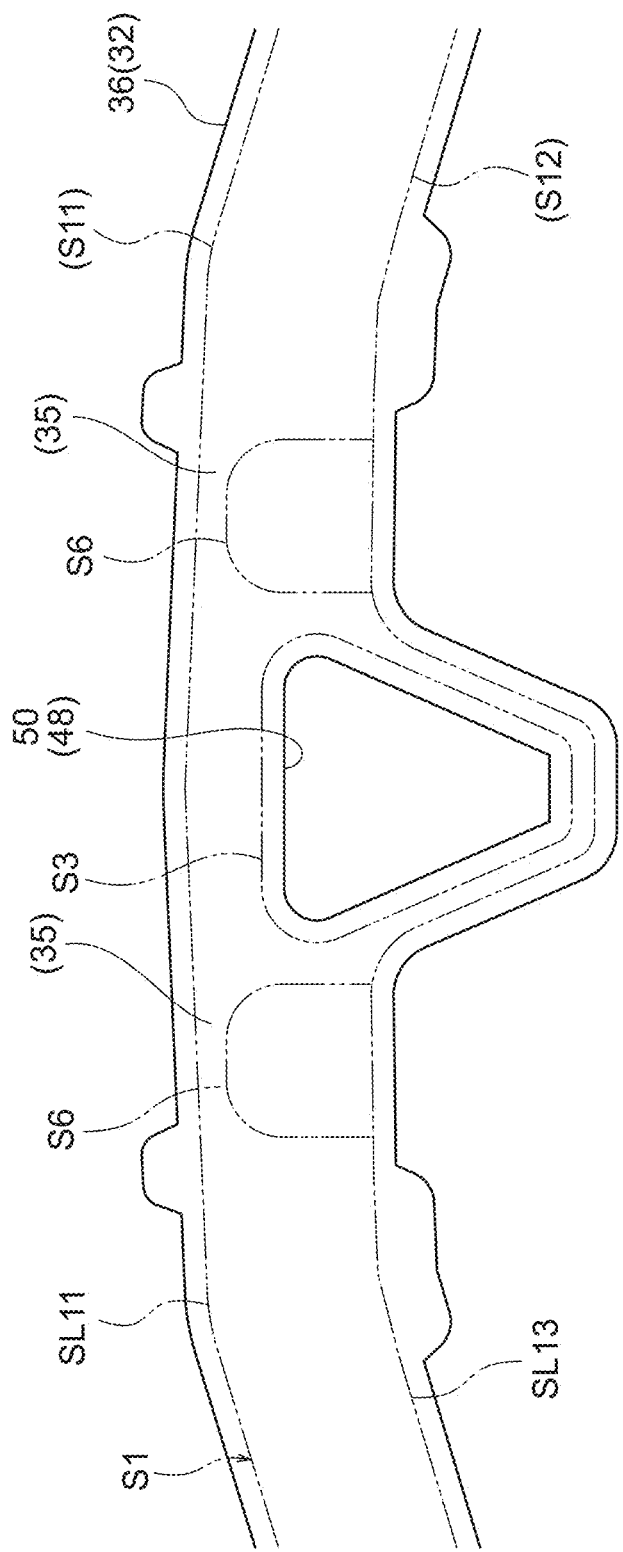

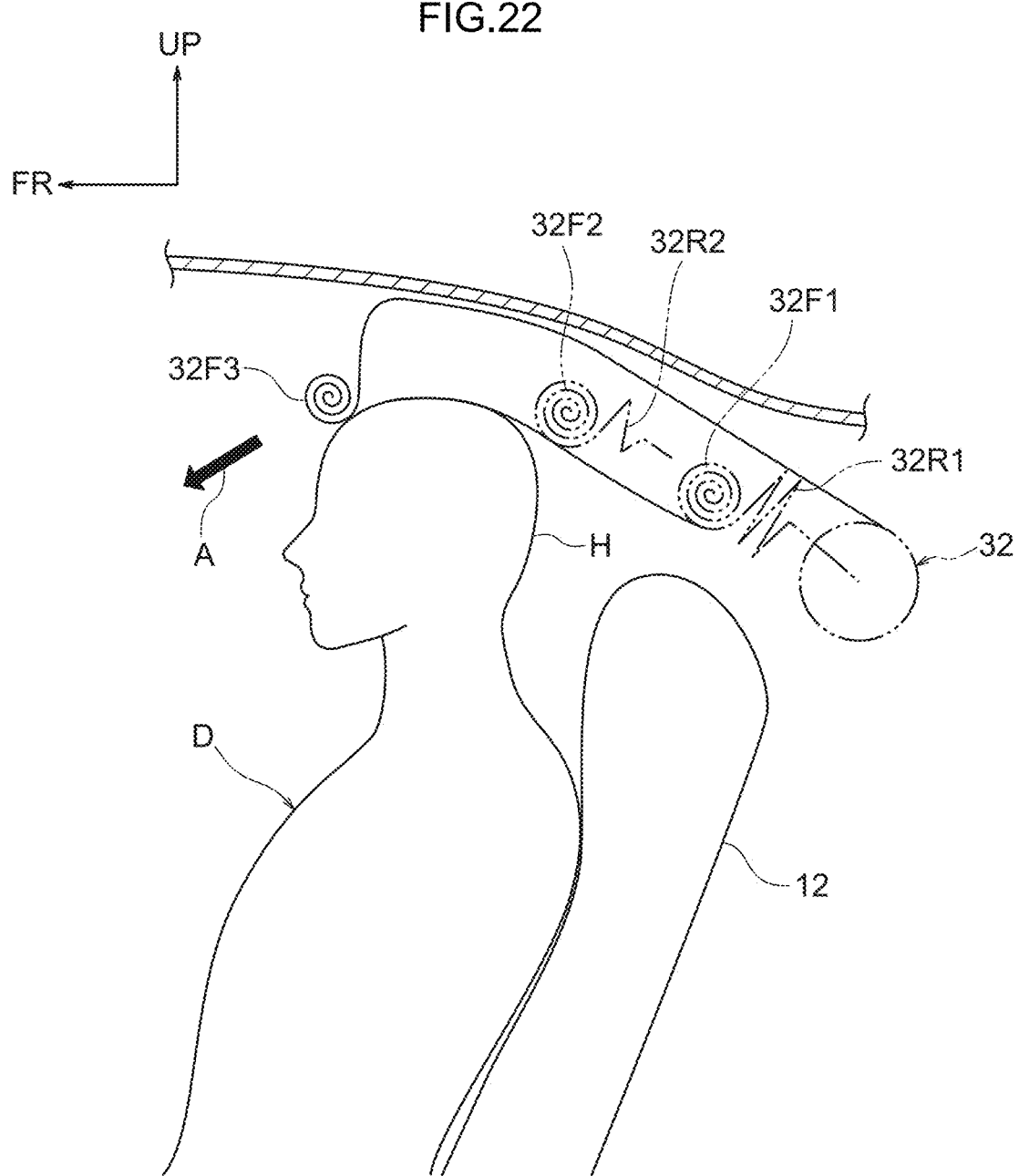

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165752 filed on Oct. 14, 2022, the disclosure of which is incorporated by reference herein.

BACKGROUND

Technical Field

The present disclosure relates to an airbag device, and to a passenger protection device equipped with the airbag device.

Related Art

The airbag device disclosed in Japanese Patent Application Laid-Open (JP-A) No. 2019-018593 has an inflator that generates high-pressure gas at the time of input of an impact, and a bag body that receives a supply of gas from the inflator and inflates and deploys from the seatback of a vehicle seat. The bag body has a torso supporting portion that deploys at the side opposite the seatback so as to sandwich the torso of the passenger seated in the vehicle seat therebetween, and a pair of head supporting portions that are connected to the torso supporting portion and respectively deploy at the both sides in the transverse direction of the vehicle seat so as to sandwich the head of the passenger therebetween. A relief portion, which passes-through in the vertical direction between the pair of head supporting portions in the deployed state and into which the head of the passenger escapes, is formed at the bag body.

The airbag device disclosed in JP-A No. 2019-218013 has an inflator, and an airbag that deploys due to gas supplied from the inflator. The airbag has a rear inflating portion that deploys at the back surface side of a seat, a pair of side inflating portions that extend toward the front from the seat transverse direction both sides of the rear inflating portion, and a pair of front inflating portions that extend from the pair of side inflating portions toward the central side and are connected together at the center and cover the front of the passenger. In this airbag, a gas flow path is formed in the order of the rear inflating portion, the side inflating portions and the front inflating portions.

SUMMARY

In the airbag device disclosed in JP-A No. 2019-018593, the torso supporting portion (airbag main body) that deploys from the seat rear side toward the seat front side with respect to the passenger, is supported in a state of being held at both sides by the pair of head supporting portions (front-rear chambers) that respectively deploy at the respective left and right sides of the head of the passenger. Similarly, in the airbag device disclosed in JP-A No. 2019-218013, the pair of front inflating portions (airbag main body), which deploy from the seat rear side toward the seat front side with respect to the passenger, are supported in states of being held at both sides by the pair of side inflating portions (front-rear chambers) that respectively deploy at the respective left and right sides of the head of the passenger.

In the above-described respective prior art, the airbag main body must pass, from the seat rear side toward the seat front side, through the narrow gap that is between the head of the passenger and the ceiling of the vehicle. However, for example, in cases in which the airbag main body starts inflating before passing through this gap, or in cases in which the friction between the head and the airbag or between the ceiling and the airbag is large, or the like, there is the possibility that the airbag main body will become stuck in this gap, and poor deployment of the airbag will arise.

In view of the above-described circumstances, an object of the present disclosure is to provide an airbag device and a passenger protection device that easily prevent poor deployment of an airbag that inflates and deploys from the seat rear side of the upper portion of a vehicle seat toward the seat front side.

An airbag device of a first aspect of the present disclosure includes an inflator configured to generate gas at a time of a collision of a vehicle, and an airbag to which the gas is supplied, and that is configured to inflate and deploy from a seat rear side of an upper portion of a vehicle seat toward a seat front side, wherein the airbag has a front-rear chamber having a left and right pair of front-rear extending portions that pass by respective left and right sides of a head of a passenger seated in the vehicle seat and inflate and deploy toward the seat front side, and a connecting portion connecting front end portions of the pair of front-rear extending portions in a seat left-right direction, and an airbag main body to which gas is supplied via a communication hole positioned at a seat rear side of the connecting portion of the front-rear chamber that has inflated and deployed, and that, owing to inflation and deployment of the front-rear chamber, passes through a gap between a ceiling of the vehicle and the head from the seat rear side toward the seat front side, and thereafter, inflates and deploys toward the seat rear side.

In the airbag device of the first aspect, at a time of a collision of the vehicle, gas generated from the inflator is supplied to the airbag, and the airbag inflates and deploys from the seat rear side of the upper portion of the vehicle seat toward the seat front side. The airbag has the front-rear chamber and the airbag main body. The front-rear chamber has the left and right pair of front-rear extending portions that pass by respective left and right sides of the head of the passenger seated in the vehicle seat and inflate and deploy toward the seat front side, and the connecting portion connecting the front end portions of the pair of front-rear extending portions in the seat left-right direction. The gas is supplied to the airbag main body via the communication hole that is positioned at the seat rear side of the connecting portion of the front-rear chamber that has inflated and deployed. Due to the inflation and deployment of the front-rear chamber, the airbag main body passes through the gap between the ceiling of the vehicle and the head of the passenger from the seat rear side toward the seat front side, and thereafter, inflates and deploys toward the seat rear side. Due thereto, it is easy to prevent the airbag main body from becoming stuck in the gap, and therefore, it is easy to prevent poor deployment of the airbag.

In an airbag device of a second aspect, in the first aspect, narrowing portions, which reduce an internal sectional surface area of the connecting portion, are provided at the connecting portion of the front-rear chamber and further toward an upstream side of a flow of the gas than the communication hole.

In the airbag device of the second aspect, because the narrowing portions are provided at the connecting portion of the front-rear chamber, it is difficult for gas to flow from the front-rear chamber to the airbag main body. As a result, it is possible to delay the inflation and deployment of the airbag main body, and it is even easier for the airbag main body to pass through the narrow gap between the head of the passenger and the ceiling of the vehicle.

In an airbag device of a third aspect, in the first aspect, an opening surface area of the communication hole is smaller than a total of internal sectional surface areas of the pair of front-rear extending portions.

In the airbag device of the third aspect, the opening surface area of the communication hole, which is formed in the connecting portion of the front-rear chamber, is smaller than the total of the internal sectional surface areas of the pair of front-rear extending portions. Therefore, it is difficult for gas to flow from the front-rear chamber through the communication hole to the airbag main body. As a result, it is possible to delay the inflation and deployment of the airbag main body, and it is even easier for the airbag main body to pass through the narrow gap between the head of the passenger and the ceiling of the vehicle.

In an airbag device of a fourth aspect, in any one of the first through third aspects, the front-rear chamber is configured by pairs of long-side edge portions of two base fabrics, which are elongated and superposed together, being sewn together at a pair of long-side sewn portions, the pair of front-rear extending portions before inflation and deployment are folded-up by being folded in a form of a roll in which the pair of long-side sewn portions are positioned at an outer periphery and an inner periphery, and, in inflated and deployed states of the respective front-rear extending portions, the pair of long-side sewn portions are disposed so as to be aligned in a seat vertical direction.

In accordance with the airbag device of the fourth aspect, the front-rear chamber is configured by the pairs of the long-side edge portions of two base fabrics, which are elongated and superposed together, being sewn together at a pair of long-side sewn portions. The pair of front-rear extending portions, before inflation and deployment, are folded-up by being folded in the form of a roll in which the pair of long-side sewn portions are positioned at the outer periphery and the inner periphery. In inflated and deployed states of the respective front-rear extending portions, the pair of long-side sewn portions are disposed so as to be aligned in the seat vertical direction. Because the pair of long-side sewn portions have higher rigidity than the other regions at the front-rear extending portions, it is difficult for the respective front-rear extending portions to bend in the seat vertical direction (i.e., the direction in which the pair of long-side sewn portions are lined-up). As a result, it is easy to prevent poor deployment of the airbag due to bending of the front-rear extending portions.

In an airbag device of a fifth aspect, the airbag device of any one of the first through fourth aspects includes a guiding fabric attached to the pair of front-rear extending portions and at which a coefficient of friction of a surface thereof is lower than a coefficient of friction of the airbag, wherein a front-side portion, which includes the airbag main body, of the airbag before inflation and deployment is rolled-up, and, at a time of inflation and deployment of the airbag, the rolled portion passes through the gap in a state in which the guiding fabric is wound on an outer side of the rolled portion.

In accordance with the airbag device of the fifth aspect, the guiding fabric, whose surface has a lower coefficient of friction than the airbag, is attached to the pair of front-rear extending portions of the front-rear chamber. The front side portion, which includes the airbag main body, of the airbag before inflation and deployment is rolled-up. At the time of inflation and deployment of the airbag, this rolled portion passes through the gap between the head of the passenger and the ceiling of the vehicle, in a state in which the guiding fabric is wound on an outer side of the rolled portion. Due thereto, it is easy for the rolled portion, which includes the airbag main body, to smoothly pass through the aforementioned gap.

In an airbag device of a sixth aspect, in the fifth aspect, a portion of the airbag before inflation and deployment, which portion is further toward a rear side than the rolled portion, is corrugated.

In accordance with the airbag device of the sixth aspect, the front side portion of the airbag before inflation and deployment, which portion includes the airbag main body, is rolled-up. The portion, which is further toward the rear side than this rolled portion, is corrugated. At the time of inflation and deployment of the airbag, the corrugated portion inflates and deploys toward the seat front side first, and the rolled portion including the airbag main body is pushed-out toward the seat front side. As a result, it is easy for the rolled portion that includes the airbag main body to smoothly pass through the gap between the head of the passenger and the ceiling of the vehicle.

In an airbag device of a seventh aspect, in the fifth aspect or the sixth aspect, the guiding fabric has a size such that, in a state in a midst of inflation and deployment of the airbag, the guiding fabric extends between the pair of front-rear extending portions, and extends at both sides in a seat front-rear direction with respect to a peak portion of the head.

In accordance with the airbag device of the seventh aspect, the guiding fabric, which is attached to the pair of front-rear extending portions of the front-rear chamber, has a size such that, in a state in the midst of inflation and deployment of the airbag, the guiding fabric extends between the pair of front-rear extending portions, and extends at both sides in the seat front-rear direction with respect to the peak portion of the head of the passenger. Due thereto, at the time of inflation and deployment of the airbag, the guiding fabric can be interposed stably between the ceiling of the vehicle and the airbag, and between the airbag and the head of the passenger.

A passenger protection device of an eighth aspect includes a vehicle seat in which a passenger sits, and the airbag device of any one of the first aspect through the seventh aspect, which is installed at a seat rear side of an upper portion of the vehicle seat.

In the passenger protection device of the eighth aspect, the airbag device is installed at the seat rear side of the upper portion of a vehicle seat in which a passenger sits. This airbag device is the airbag device of any one of the first through seventh aspects. Therefore, effects that are similar to any one of the first through seventh aspects are obtained.

As described above, in the airbag device and passenger protection device relating to the present disclosure, it is easy to prevent poor deployment of an airbag that inflates and deploys from the seat rear side of the upper portion of a vehicle seat toward the seat front side.

BRIEF DESCRIPTION OF THE DRAWINGS

Exemplary embodiments of the present disclosure will be described in detail based on the following figures, wherein:

FIG. 6 is a deployed view of a front-rear chamber of the airbag;

FIG. 7A is an enlarged drawing illustrating a portion of FIG. 6 in an enlarged manner;

FIG. 7B is an enlarged drawing illustrating a modified portion of FIG. 6 in an enlarged manner;

FIG. 7A is an enlarged drawing illustrating another modified portion of FIG. 6 in an enlarged manner;

FIG. 22 is a side view for explaining rolling-up and corrugating of the airbag in the passenger protection device relating to the second embodiment.

DETAILED DESCRIPTION

First Embodiment

Figure 1:
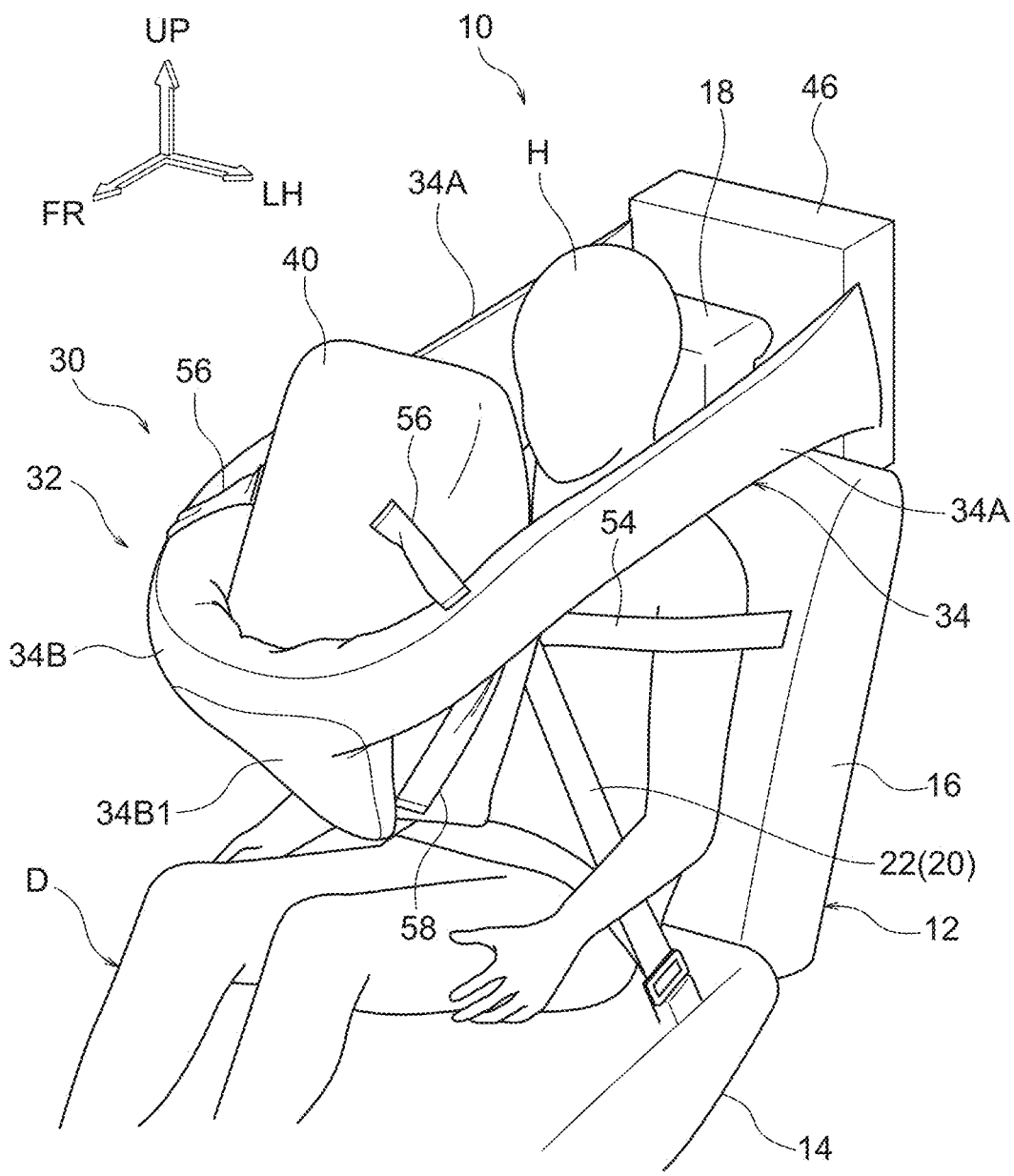
FIG. 1 is a perspective view illustrating a state in which an airbag has inflated and deployed, at a passenger protection device relating to a first embodiment.
Figure 2:
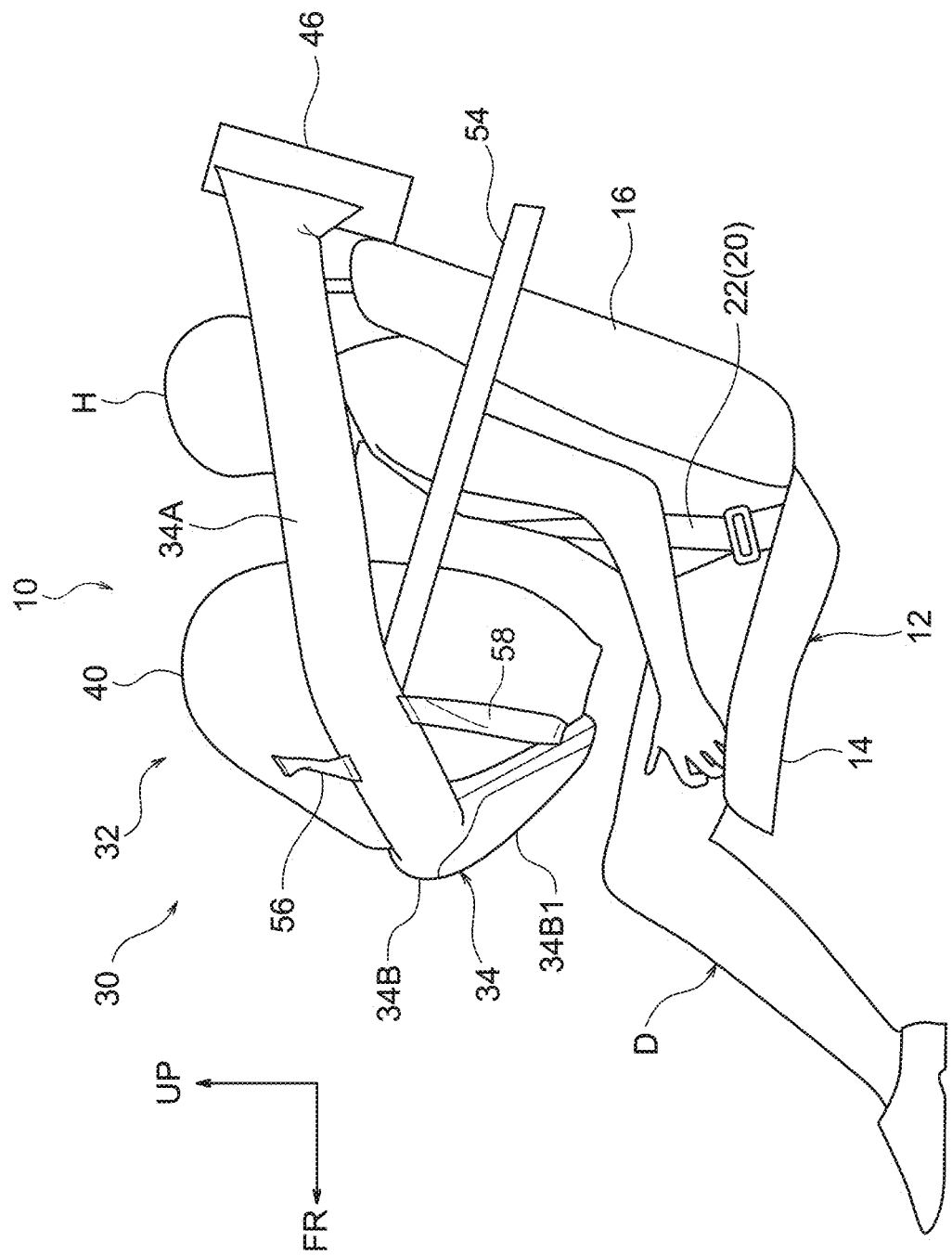
FIG. 2 is a side view illustrating the structures shown in FIG. 1 in a state of being viewed from a vehicle left side.

A passenger protection device 10 relating to a first embodiment of the present disclosure is described hereinafter with reference to FIG. 1 through FIG. 18. Note that, in the respective drawings, there are cases in which some of the reference numerals are omitted in order to make the drawings easy to understand. Further, arrow FR, arrow UP, arrow LH and arrow RH that are shown appropriately in the respective drawings indicate the forward direction (advancing direction), upward direction, leftward direction and rightward direction of a vehicle, respectively. When description is given hereinafter by using merely front-rear, left-right, and vertical directions, they refer to the front-rear of the vehicle front-rear direction, the left-right of the vehicle left-right direction, and the vertical of the vehicle vertical direction, unless otherwise specified.

As illustrated in FIG. 1 through FIG. 5, the passenger protection device 10 is structured by a vehicle seat 12 and an airbag device 30. The vehicle seat 12 here is a rear seat of a vehicle (automobile), but may be a front seat. The vehicle seat 12 has a seat cushion 14, a seatback 16 provided so as to stand at the upper side of the rear end portion of the seat cushion 14, and a headrest 18 connected to the upper end portion of the seatback 16. The front-rear, left-right, and vertical directions of the vehicle seat 12 coincide with the front-rear, left-right, and vertical directions of the vehicle.

Note that FIG. 1 through FIG. 5 illustrate a state in which a crash test dummy D, which serves as a model of a passenger (a seated person) who is to be protected, is seated on the seat cushion 14 of the vehicle seat 12. The dummy D is, for example, an AM50 (50th percentile U.S. adult male) dummy for a front collision test (Hybrid III). The dummy D is seated in the standard seated posture prescribed by the crash test method, and the vehicle seat 12 is positioned at the standard set position corresponding to that seated posture. Hereinafter, the dummy D will be called "passenger D" in order to facilitate understanding.

The passenger D seated on the seat cushion 14 of the vehicle seat 12 is restrained in the vehicle seat 12 by a seatbelt 22 (refer to FIG. 1 through FIG. 3; not illustrated in FIG. 4 and FIG. 5) of a seatbelt device 20. The seatbelt device 20 is a three-point seatbelt device, and is a so-called seat-mounted seatbelt device in which an unillustrated retractor, anchor and buckle are provided at the vehicle seat 12.

The airbag device 30 has an airbag 32, a pair of inflators 44 (refer to FIG. 6), and a module case 46. At usual times, the airbag 32 is stored in a folded-up state within the module case 46 together with the pair of inflators 44. The module case 46 is formed in the shape of a rectangular parallelopiped that is hollow. The module case 46 is disposed at the rear of the upper portion of the vehicle seat 12 (specifically, at the rear of the upper end portion of the seatback 16 and the headrest 18), and is fixed to the upper end portion of the seatback 16 or to an unillustrated vehicle body.

The airbag 32 receives the supply of gas from the pair of inflators 44, and inflates and deploys from the rear side of the upper portion of the vehicle seat 12 toward the front side. This airbag 32 has a front-rear chamber 34 and an airbag main body 40. The front-rear chamber 34 has a left and right pair of front-rear extending portions 34A that inflate and deploy past the respective left and right sides of head H of the passenger D toward the front side, and a connecting portion 34B that connects the front end portions of the pair of front-rear extending portions 34A in the left-right direction. The airbag main body 40 inflates and deploys at the rear side of the connecting portion 34B toward the passenger D side (the rear side), later than the front-rear chamber 34.

The front-rear chamber 34 is formed in the shape of an elongated bag due to two elongated base fabrics 36, 38 that are illustrated in FIG. 6 being superposed and the peripheral edge portions thereof being sewn together at sewn portion S1. At this sewn portion S1, sewing line SL11 and sewing line SL12 are sewn together, sewing line SL13 and sewing line SL14 are sewn together, sewing line SL15 and sewing line SL16 are sewn together, and sewing line SL17 and sewing line SL18 are sewn together. Sewn portion S11 of sewing line SL11 and sewing line SL12, and sewn portion S12 of sewing line SL13 and sewing line S14, correspond to the "long-side sewn portions" in the present disclosure. At these long-side sewn portions S11, S12, the pair of long-side edge portions of the base fabric 36 and the pair of long-side edge portions of the base fabric 38 are sewn together.

Figure 8:
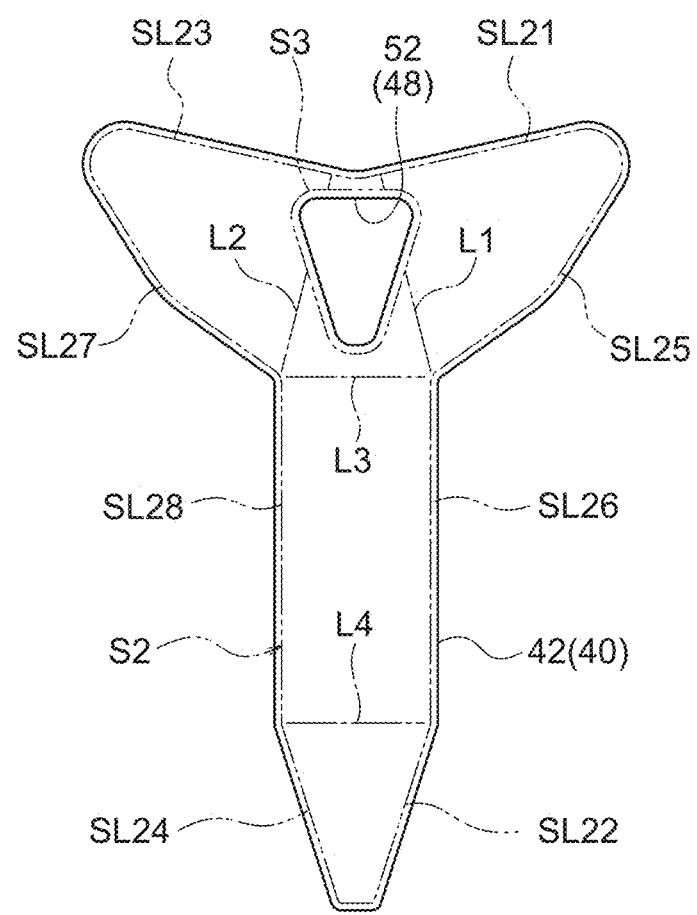
FIG. 8 is a deployed view of an airbag main body of the airbag.

The airbag main body 40 is formed in the shape of a bag due to a single base fabric 42 illustrated in FIG. 8 being folded-over along four fold lines L1, L2, L3, L4, and being sewn together at sewn portion S2. At this sewn portion S2, sewing line SL21 and sewing line SL22 are sewn together, sewing line SL23 and sewing line SL24 are sewn together, sewing line SL25 and sewing line SL26 are sewn together, and sewing line SL27 and sewing line SL28 are sewn together. The above-described base fabrics 36, 38, 42 are formed of fabric materials of nylon or polyester for example.

The length direction both end portions of the front-rear chamber 34 are a left and right pair of inflator accommodating portions 34C that accommodate the pair of inflators 44. The length direction central portion of the front-rear chamber 34 is the connecting portion 34B. The portions between the connecting portion 34B and the pair of inflator accommodating portions 34C are the front-rear extending portions 34A respectively. The pair of inflators 44 are combustion or cold gas cylindrical inflators, and generate gas by being operated. Operation of the inflators 44 is controlled by an unillustrated control device, and the inflators 44 are made to generate gas at the time of a collision of the vehicle.

The pair of inflator accommodating portions 34C are disposed within the module case 46 so as to be dispersed at the respective left and right sides. The inflators 44 accommodated within the inflator accommodating portions 34C are disposed in postures in which the axial directions thereof run along the vertical direction of the seatback 16. For example, a pair of upper and lower stud bolts are provided at each inflator 44. The pairs of stud bolts pass-through the inflator accommodating portions 34C, the module case 46, and an unillustrated frame of the seatback 16, and nuts are screwed-together with these stud bolts. Due thereto, the inflator accommodating portions 34C, the inflators 44 and the module case 46 are fixed to the frame of the seatback 16.

The pair of front-rear extending portions 34A are respectively formed in elongated tube shapes. The connecting portion 34B is formed in the shape of a substantially T-shaped bag that communicates with the respective front-rear extending portions 34A. The connecting portion 34B is sewn to the airbag main body 40 at sewn portion S3 (refer to FIG. 6 and FIG. 8) that is provided at the central portion of the connecting portion 34B. As an example, the sewn portion S3 is formed in a substantially upside-down trapezoidal shape. A communication hole 48, which communicates the interior of the connecting portion 34B and the interior of the airbag main body 40, is formed at the inner side of the sewn portion S3. As an example, the communication hole 48 is formed in a substantially upside-down trapezoidal shape. The communication hole 48 is structured by a through-hole 50 formed in the base fabric 36 of the front-rear chamber 34, and a through-hole 52 formed in the base fabric 42 of the airbag main body 40.

The two base fabrics 36, 38 that structure the front-rear chamber 34 are sewn together also at a left and right pair of sewn portions S4 that are illustrated in FIG. 6 and FIG. 7A. Due thereto, a left and right pair of narrowing portions 35 are provided at the connecting portion 34B of the front-rear chamber 34. The pair of narrowing portions 35 are disposed at the upstream side of the flow of the gas that flows within the front-rear chamber 34, with respect to the communication hole 48. The internal sectional surface area of the connecting portion 34B (i.e., the sectional surface area of the flow path of the connecting portion 34B) is reduced by the pair of narrowing portions 35. Note that there may be a structure in which sewn portions S5 that are illustrated in FIG. 7B or sewn portions S6 that are illustrated in FIG. 7B are provided instead of the sewn portions S4 that are illustrated in FIG. 6 and FIG. 7A. Due thereto, the internal sectional surface area of the pair of narrowing portions 35 can be adjusted.

At usual times, the pair of front-rear extending portions 34A, the connecting portion 34B and the airbag main body 40 are folded-up by a predetermined way of folding, and are accommodated within the module case 46. When the pair of inflators 44 operate, gas is generated at the interiors of the pair of inflator accommodating portions 34C. The gas generated within the pair of inflator accommodating portions 34C passes-through the pair of front-rear extending portions 34A, and flows to the connecting portion 34B side, and passes-through the communication hole 48 and is supplied to the interior of the airbag main body 40. Due thereto, the airbag 32 inflates and deploys in the order of the pair of front-rear extending portions 34A, the connecting portion 34B and the airbag main body 40. At the time of inflation and deployment of the airbag 32, unillustrated tear lines formed in the module case 46 receive the inflation pressure of the airbag 32 and rupture. Due thereto, the airbag 32 can inflate and deploy toward the outer side of the module case 46.

Figure 3:
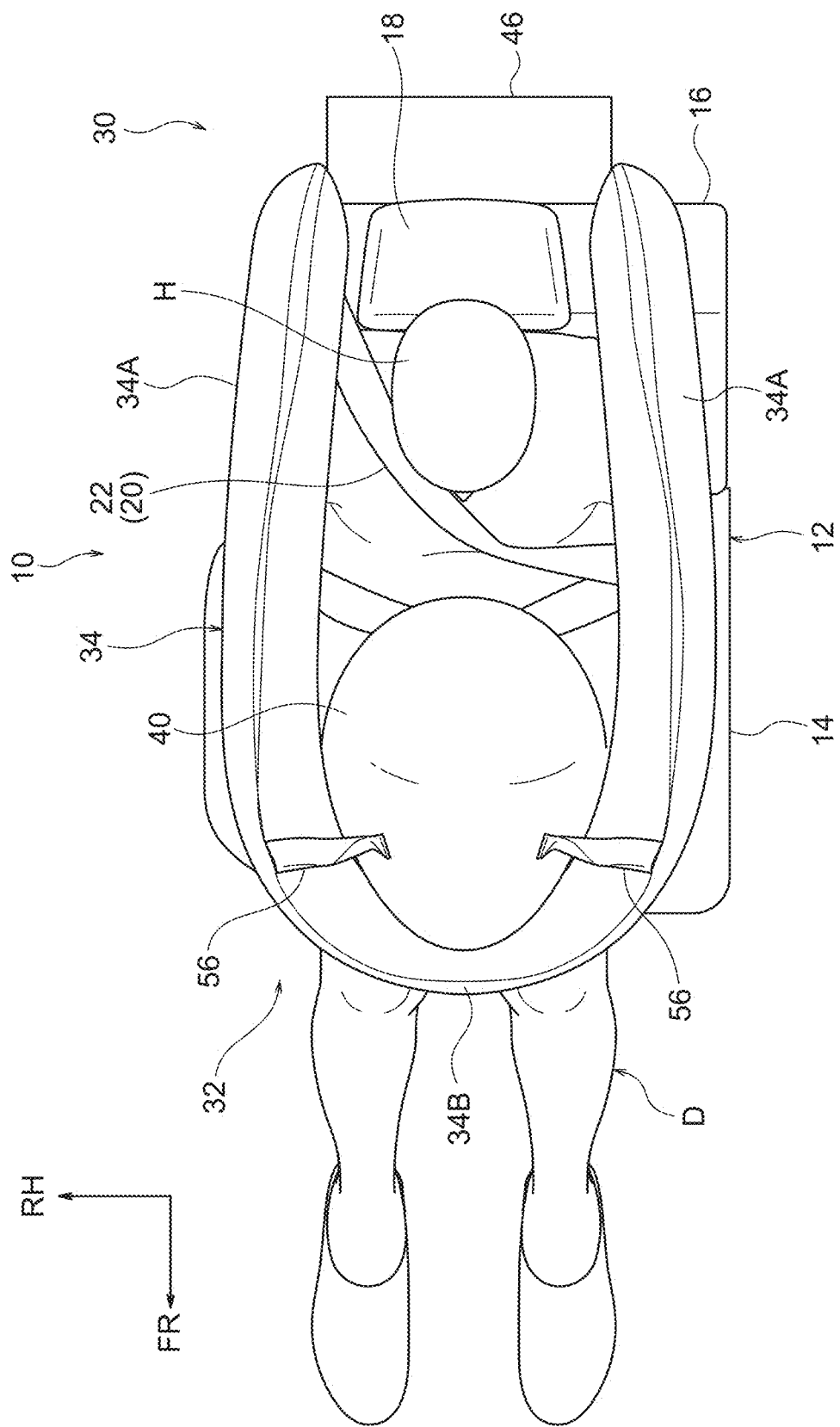
FIG. 3 is a plan view illustrating the structures shown in FIG. 1 in a state of being viewed from a vehicle upper side.
Figure 4:
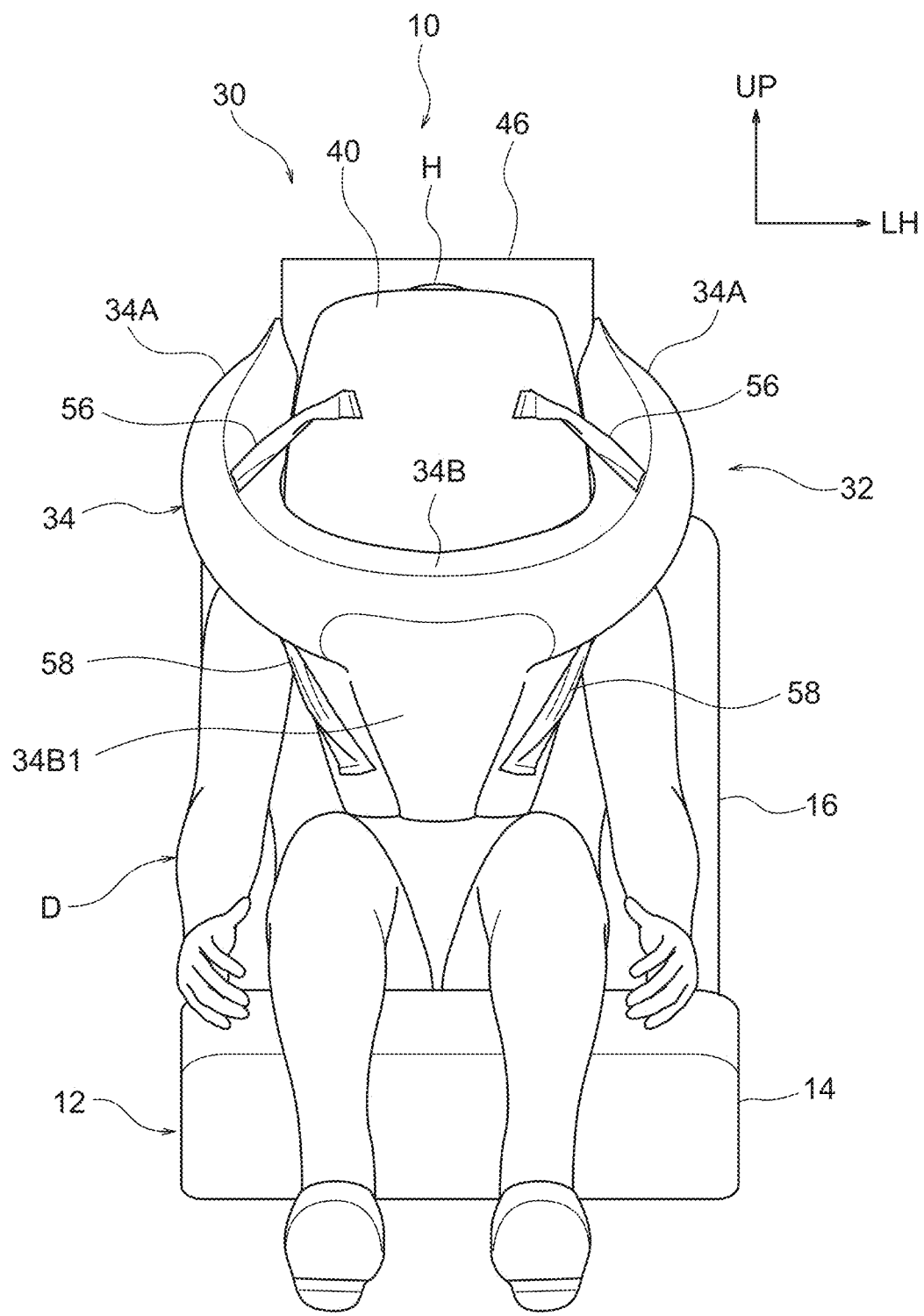
FIG. 4 is a front view illustrating the structures shown in FIG. 1 in a state of being viewed from a vehicle front side.
Figure 5:
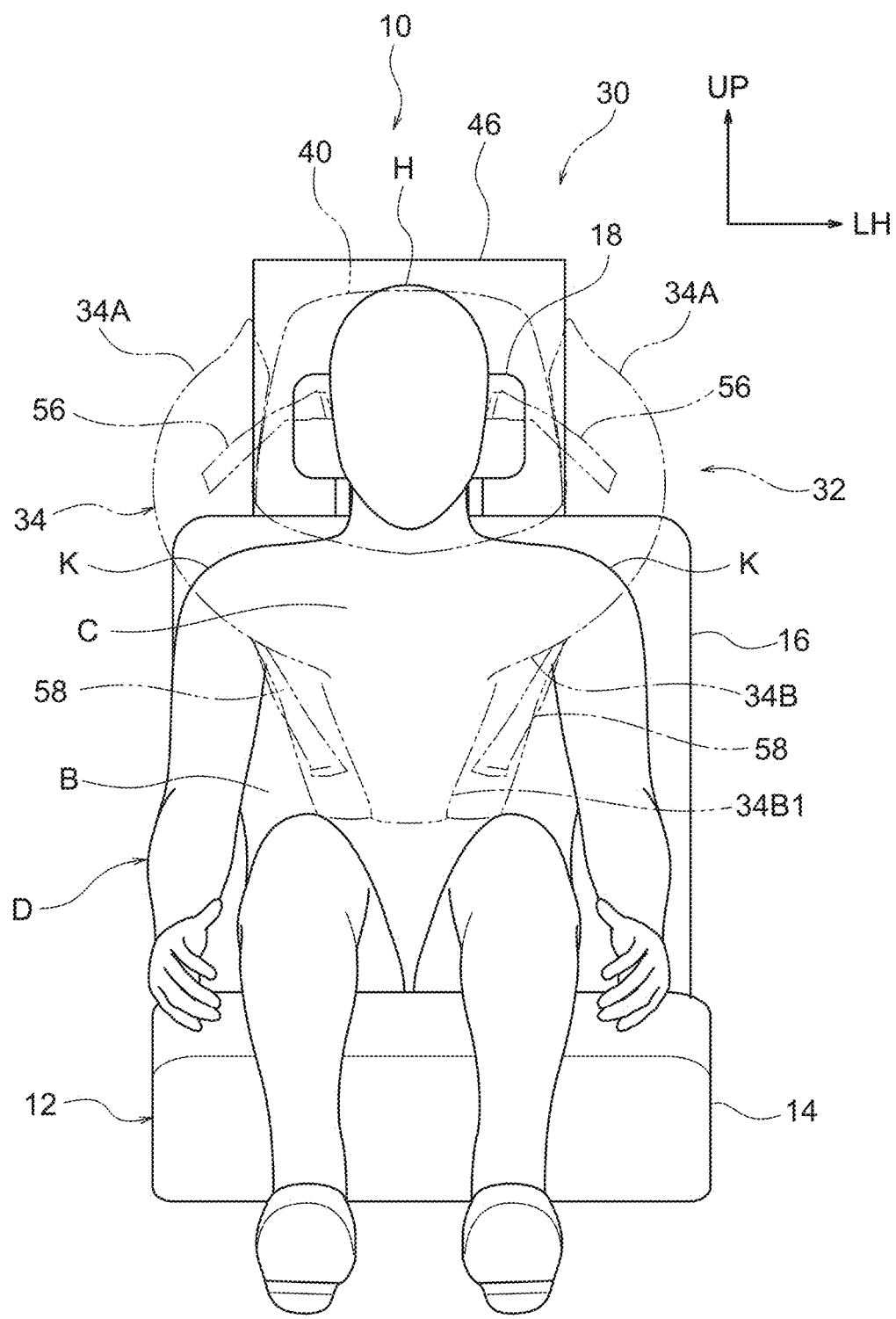
FIG. 5 is a front view illustrating the airbag of FIG. 4 in a state of viewing through the airbag.
Figure 9:
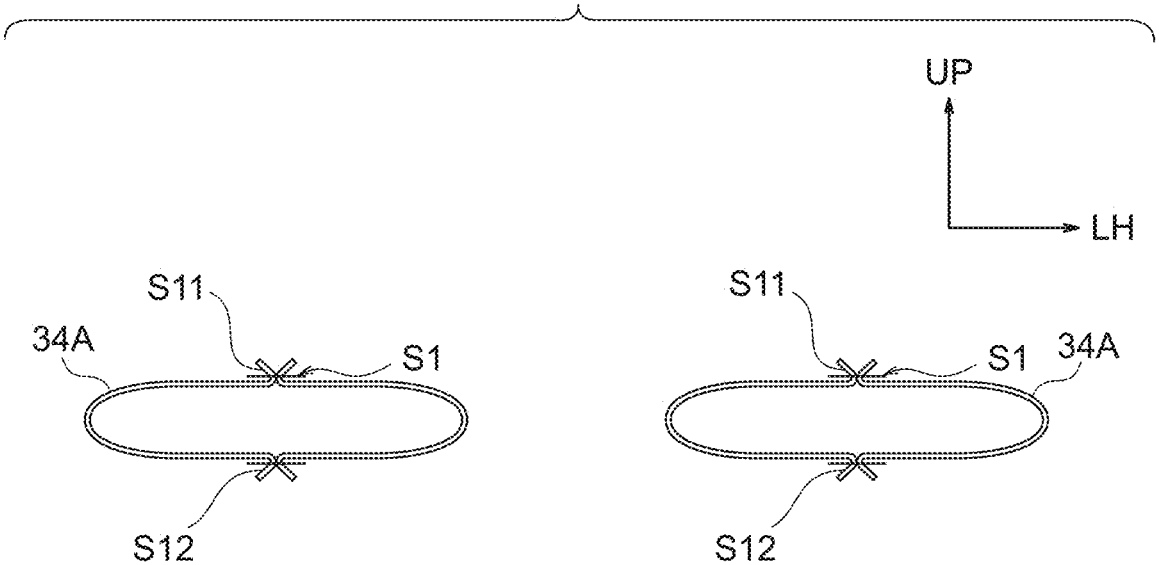
FIG. 9 is a cross-sectional view illustrating a state in the midst of inflation and deployment of a pair of front-rear extending portions of the front-rear chamber.
Figure 10:
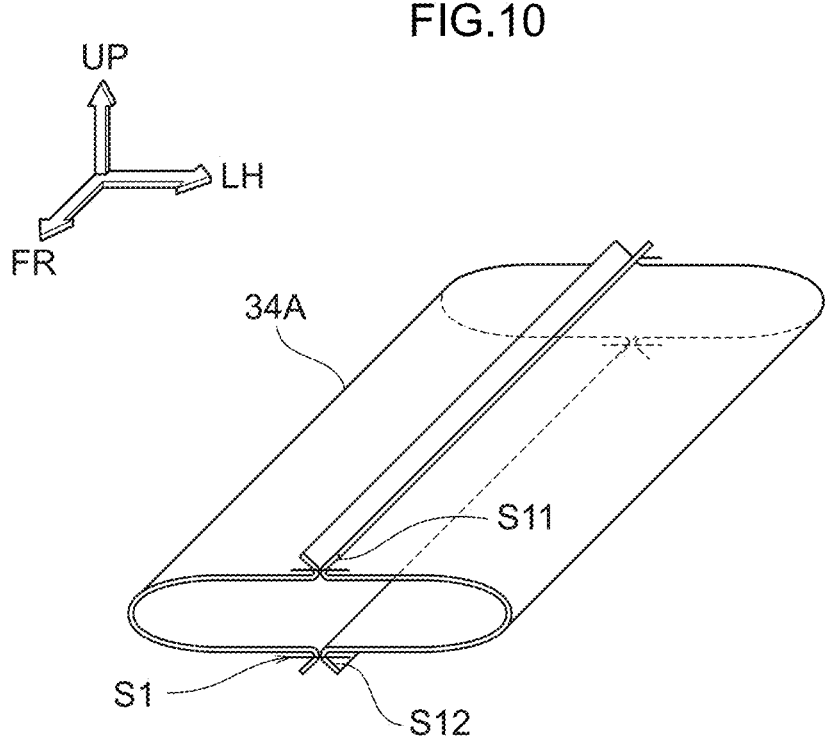
FIG. 10 is a perspective view illustrating a portion of the front-rear extending portion.

The pair of front-rear extending portions 34A that have inflated and deployed extend in the front-rear direction at the respective left and right sides of the head H of the passenger D, and face the head H from the respective left and right sides with gaps therebetween respectively. As illustrated in FIG. 9, at the pair of front-rear extending portions 34A that have inflated and deployed, the pair of long-side sewn portions S11, S12 are disposed so as to be aligned in the vertical direction. Note that, in FIG. 9, for convenience of explanation, illustration of the head H is omitted, and the pair of front-rear extending portions 34A are illustrated so as to be near one another. The pair of front-rear extending portions 34A become postures of being inclined downward while heading toward the front side, by being tensed obliquely downward and rearward by a left and right pair of rear tethers 54 that are described later. The front end portions of the pair of front-rear extending portions 34A that have inflated and deployed are in states of being joined in the left-right direction by the connecting portion 34B that has inflated and deployed. As illustrated in FIG. 3, the front-rear chamber 34, which includes the pair of front-rear extending portions 34A and the connecting portion 34B, inflates and deploys in a U-shape that opens rearward as seen in plan view.

As illustrated in FIG. 1, FIG. 2, FIG. 4 and FIG. 5, an enlarged portion 34B1, whose dimension in the vertical direction is larger than that of the left and right both end portions of the connecting portion 34B, is provided at the left-right direction central portion of the connecting portion 34B that has inflated and deployed. This enlarged portion 34B1 protrudes-out further toward the lower side than the left and right both end portions of the connecting portion 34B. The aforementioned communication hole 48 is formed in the enlarged portion 34B1. The communication hole 48 is positioned at the rear side of the left-right direction central portion of the connecting portion 34B that has inflated and deployed. The gas from the inflators 44 passes-through the communication hole 48, and is supplied rearward into the interior of the airbag main body 40. Due thereto, the airbag main body 40 inflates and deploys at the rear of the connecting portion 34B and toward the passenger D side (the rear side), later than the front-rear chamber 34.

The airbag main body 40 that has inflated and deployed faces the head H, chest C and abdomen B of the passenger D from the front side with a gap therebetween. The airbag main body 40 that has inflated and deployed restrains, from the front side, the passenger D who inertially moves forward due to the impact of a vehicle collision. At the time of restraining the passenger, the front-rear chamber 34 is stretched in the front-rear direction, and the airbag main body 40 is compressed in the front-rear direction.

The airbag 32 configured as described above is folded up by external rolling, and is accommodated within the module case 46. External rolling is rolling that folds the airbag 32 up in the form of a roll from the front end side of the airbag 32 toward the upper side and rear side, so as to be folded up in the opposite direction to that of the deployment process of the airbag 32 as seen in a side view. In other words, the airbag 32 is folded up in the form of a roll that is wound leftward (clockwise) as seen from the vehicle left side. In this external rolling, the pair of front-rear extending portions 34A of the front-rear chamber 34 are folded up such that the long-side sewn portions S11 are positioned at the inner peripheral side, and the long-side sewn portions S12 are positioned at the outer peripheral side.

The left and right pair of rear tethers 54, a left and right pair of front upper tethers 56, and a left and right pair of front lower tethers 58 are attached to the airbag 32 of the above-described structure. The rear tethers 54, the front upper tethers 56 and the front lower tethers 58 are structured in the shapes of elongated strips by fabric materials of nylon or polyester for example. The fabric materials that structure the rear tethers 54, the front upper tethers 56 and the front lower tethers 58 are structured to be harder to stretch than the base fabrics 36, 38 that structure the front-rear chamber 34 and the base fabric 42 that structures the airbag main body 40. This difficulty of stretching can be adjusted by the material, the thickness or the like of the fabric.

Respective one end portions of the pair of rear tethers 54 are attached (sewn) to respective length direction intermediate portions of the pair of front-rear extending portions 34A (in detail, the front portions of the respective front-rear extending portions 34A that have inflated and deployed). The respective another end portions of the pair of rear tethers 54 are respectively attached to the seatback 16 or the unillustrated vehicle body, further toward the rear side than the passenger D. In the state in which the airbag 32 has inflated and deployed, the pair of rear tethers 54 extend in the front-rear direction beneath the pair of front-rear extending portions 34A. In this state, the pair of rear tethers 54 are in postures of being inclined downward while heading rearward. Due thereto, the pair of front-rear extending portions 34A are pulled-in obliquely rearward and downward by the pair of rear tethers 54. Due thereto, at the time of completion of the inflation and deployment of the airbag 32, the airbag swaying in the vertical direction and the front-rear direction is suppressed.

The pair of front upper tethers 56 connect the front portions of the pair of front-rear extending portions 34A, and the left and right both side regions at the front portion of the upper portion, which inflates and deploys at further toward the upper side than the front-rear chamber 34, of the airbag main body 40. Respective one end portions of the pair of front upper tethers 56 are respectively sewn to the left and right both side regions at the front portion of the upper portion, which inflates and deploys at further toward the upper side than the front-rear chamber 34, of the airbag main body 40. Respective another end portions of the pair of front upper tethers 56 are respectively sewn to the front portions of the pair of front-rear extending portions 34A. At the time of completion of the inflation and deployment of the airbag 32, the pair of front upper tethers 56 suppress upward rotation of the airbag main body 40 around the connecting portion 34B.

The pair of front lower tethers 58 connect the front portions of the pair of front-rear extending portions 34A, and the left and right both side regions at the lower portion, which inflates and deploys at further toward the lower side than the front-rear chamber 34, of the airbag main body 40. Respective one end portions of the pair of front lower tethers 58 are respectively sewn to the left and right both side regions at the lower portion, which inflates and deploys at further toward the lower side than the front-rear chamber 34, of the airbag main body 40. Respective another end portions of the pair of front lower tethers 58 are respectively sewn to the front portions of the pair of front-rear extending portions 34A. At the time of completion of the inflation and deployment of the airbag 32, the pair of front lower tethers 58 suppress downward rotation of the airbag main body 40 around the connecting portion 34B.

The above-described airbag device 30 has an unillustrated electronic control device (ECU) that controls operation of the pair of inflators 44. The control device is electrically connected to the pair of inflators 44 and to an unillustrated collision sensor. On the basis of information from the collision sensor, the control device can sense or predict, for each type of collision described hereinafter, the occurrence of a front collision of any of various types (or the fact that a front collision is inevitable) at the automobile to which the airbag device 30 is applied.

When the control device senses or predicts a front collision on the basis of information from the collision sensor, the control device causes the pair of inflators 44 to operate. Note that, in addition to full-overlap front collisions, offset front collisions such as oblique collisions and small overlap collisions and the like are included among the types of front collisions in which the control device causes the inflators 44 to operate.

Figure 11:
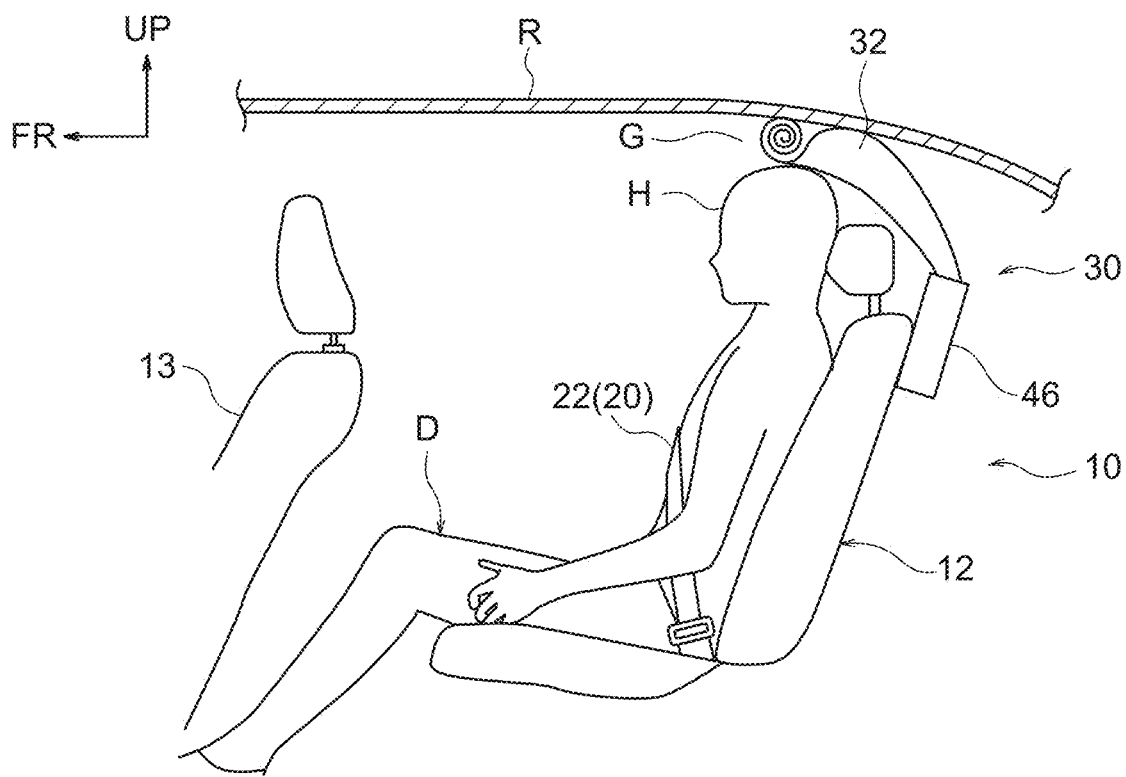
FIG. 11 is a side view illustrating a state in the midst of passage of the airbag, which is in the initial stage of inflation and deployment, through a gap between a head of a passenger and a ceiling of a vehicle.
Figure 12:
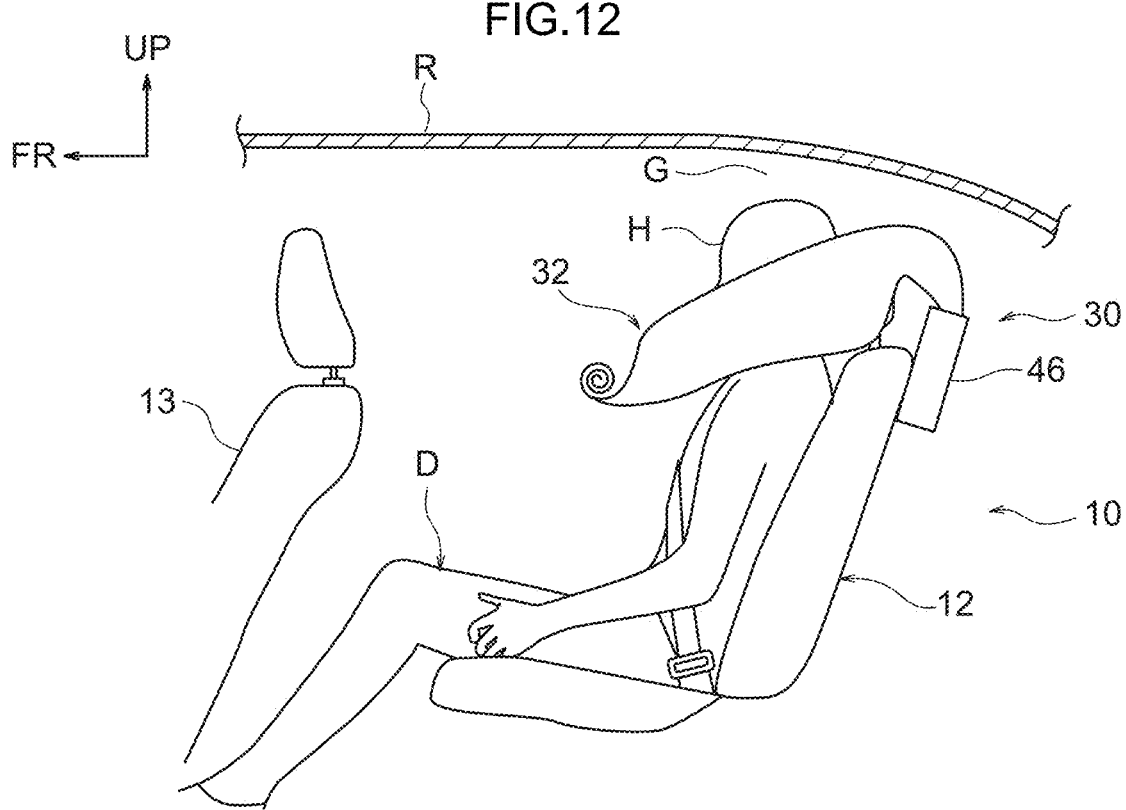
FIG. 12 is a side view corresponding to FIG. 11 and illustrating a state during an intermediate stage of the inflation and deployment of the airbag.
Figure 13:
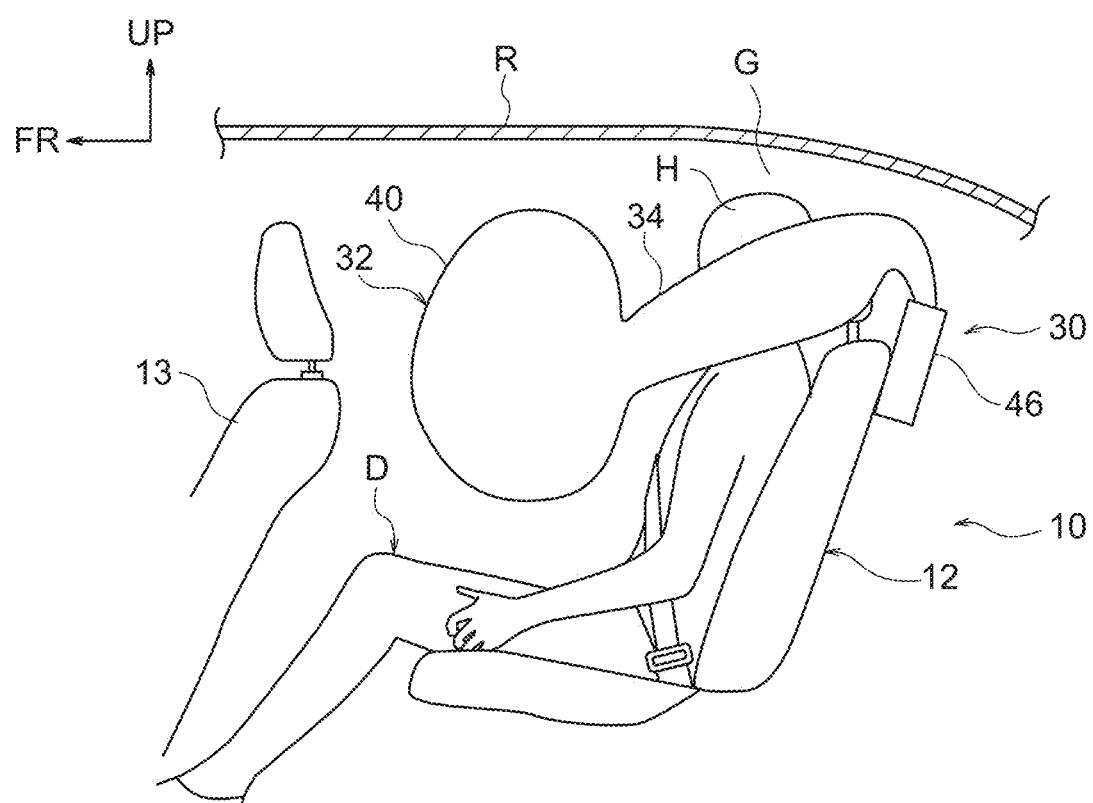
FIG. 13 is a side view corresponding to FIG. 11 and illustrating a state in which the inflation and deployment of the airbag have been completed.

When the pair of inflators 44 operate, due to the pressure of the gas generated within the pair of inflator accommodating portions 34C of the front-rear chamber 34, the external rolling of the pair of front-rear extending portions 34A comes undone from the rear end sides (the proximal end sides) thereof, and the pair of front-rear extending portions 34A inflate and deploy toward the front side. Due to the inflation and deployment of this pair of front-rear extending portions 34A, the region at the front side of the airbag 32, which includes the connecting portion 34B and the airbag main body 40, is deployed toward the front side. At this time, as illustrated in FIG. 11 and FIG. 12, the front side region of the airbag 32 passes through gap G that is between the head H of the passenger D and ceiling R of the vehicle, from the rear side toward the front side. Thereafter, the gas supplied to the connecting portion 34B of the front-rear chamber 34 passes-through the communication hole 48, and gas is supplied to the airbag main body 40. Due thereto, the airbag main body 40 inflates and deploys as illustrated in FIG. 13. Note that the airbag 32 is illustrated schematically in FIG. 11 through FIG. 13. Further, in FIG. 11 through FIG. 13, reference numeral 13 is a front seat.

Operation and Effects

Operation and effects of the first embodiment are described next.

The passenger protection device 10 relating to the present embodiment has the vehicle seat 12 in which the passenger D of the vehicle (automobile) sits, and the airbag device 30 that protects the passenger D at the time of a collision of the vehicle. At this airbag device 30, at the time of a collision of the vehicle, gas generated from the pair of inflators 44 is supplied to the airbag 32, and the airbag 32 inflates and deploys from the rear side of the upper portion of the vehicle seat 12 toward the front side.

The airbag 32 has the front-rear chamber 34 and the airbag main body 40. The front-rear chamber 34 has the left and right pair of front-rear extending portions 34A that pass the respective left and right sides of the head H of the passenger D and inflate and deploy toward the front side, and the connecting portion 34B that connects the front end portions of the pair of front-rear extending portions 34A in the left-right direction. The aforementioned gas is supplied to the airbag main body 40 via the communication hole 48 that is formed in the rear side surface at the connecting portion 34B of the front-rear chamber 34 that has inflated and deployed. Due to the inflation and deployment of the front-rear chamber 34, the airbag main body 40 passes, from the rear side toward the front side, through the gap G between the ceiling R of the vehicle and the head H of the passenger D, and thereafter, inflates and deploys toward the passenger D side (the rear side).

Namely, in the present embodiment, the gas, which has passed through the pair of front-rear extending portions 34A and the connecting portion 34B of the front-rear chamber 34, is supplied from the communication hole 48 toward the rear side and into the airbag main body 40. Due thereto, the airbag main body 40 can be inflated and deployed sufficiently later than the front-rear chamber 34. As a result, the airbag main body 40 inflates and deploys after passing through the aforementioned gap G due to the inflation and deployment of the front-rear chamber 34. Due thereto, it is easy to prevent the airbag main body 40 from becoming stuck in the aforementioned gap G, and therefore, it is easy to prevent poor deployment of the airbag 32.

Further, in accordance with the present embodiment, the pair of narrowing portions 35, which reduce the internal sectional surface area of the connecting portion 34B, are provided at the connecting portion 34B of the front-rear chamber 34, further toward the upstream side of the flow of the gas than the communication hole 48. Due thereto, it is difficult for gas to flow from the side of the pair of front-rear extending portions 34A toward the side of the communication hole 48 of the connecting portion 34B, and the supply of gas to the airbag main body 40 is delayed even more. As a result, it is possible to even further delay the inflation and deployment of the airbag main body 40, and it is even easier for the airbag main body 40 to pass through the narrow gap G between the head H of the passenger D and the ceiling R of the vehicle.

Further, in the present embodiment, after the inflation and deployment of the front-rear chamber 34, the airbag main body 40 inflates and deploys toward the passenger D side at the rear side of the connecting portion 34B. Therefore, the gap between the airbag main body 40 and the passenger D becomes small. As a result, the passenger D is restrained by the airbag main body 40 at an early stage, and therefore, the performance of the airbag main body 40 of restraining the passenger D at an early stage can be improved.

Further, in the present embodiment, the front-rear chamber 34 is structured due to the pairs of the long-side edge portions of the two base fabrics 36, 38, which are elongated and are superposed together, being sewn together at the pair of long-side sewn portions S11, S12. The pair of front-rear extending portions 34A before inflating and deploying are folded-up by external rolling in which the pair of long-side sewn portions S11, S12 are positioned at the outer periphery and the inner periphery. In the inflated and deployed state of each of the front-rear extending portions 34A, the pair of long-side sewn portions S11, S12 are disposed so as to be aligned in the vertical direction. The pair of long-side sewn portions S11, S12 have higher rigidity than the other regions at the front-rear extending portions 34A, and therefore, it is difficult for each of the front-rear extending portions 34A to bend in the vertical direction (i.e., the direction in which the pair of long-side sewn portions S11, S12 are lined-up). As a result, it is easy to prevent poor deployment of the airbag 32 due to the aforementioned bending of the front-rear extending portions 34A.

Figure 14:
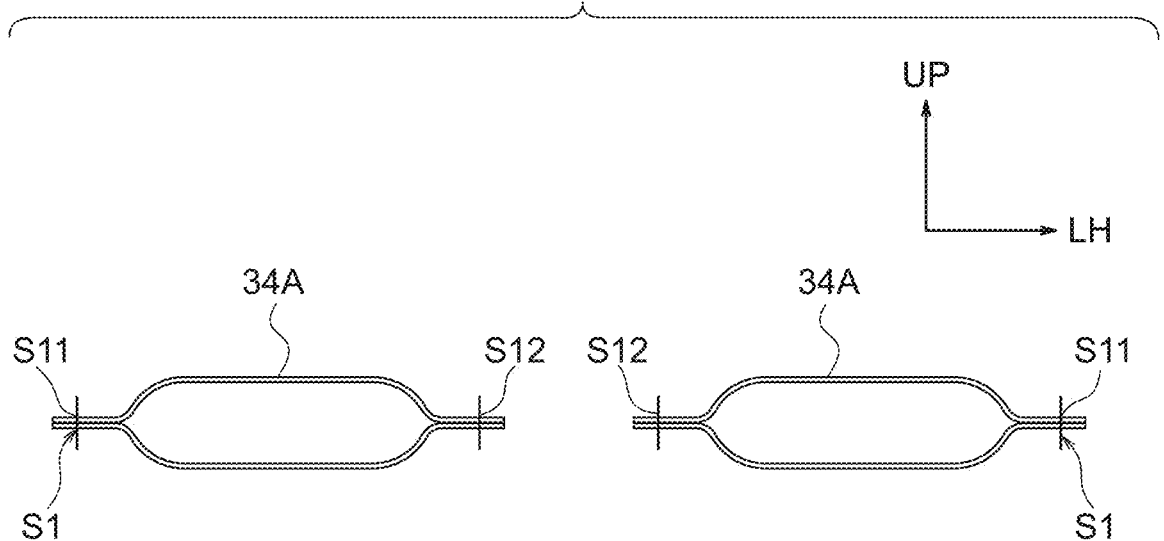
FIG. 14 is a cross-sectional view illustrating a state in the midst of inflation and deployment of a pair of front-rear extending portions of a front-rear chamber relating to a comparative example.
Figure 15:
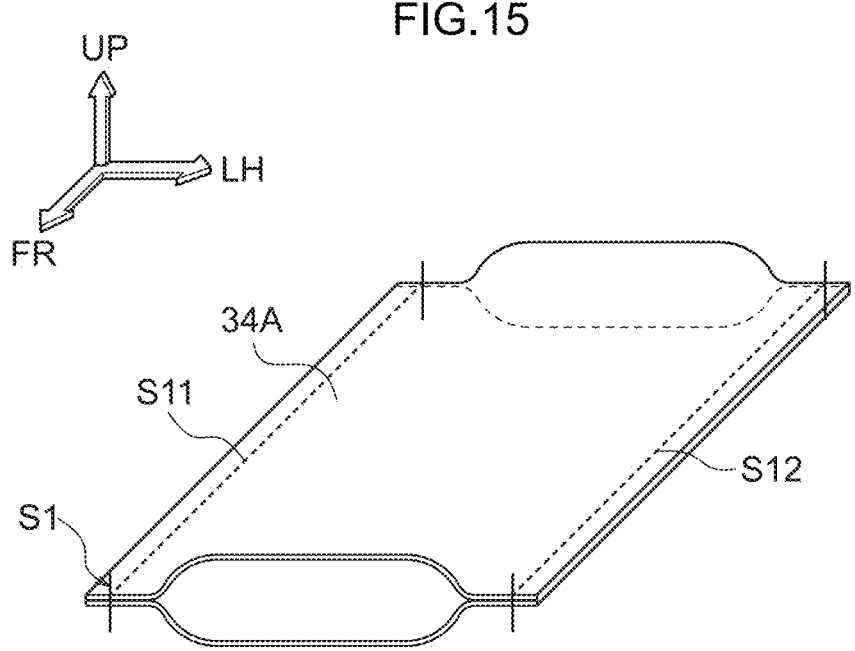
FIG. 15 is a perspective view illustrating a portion of the front-rear extending portion illustrated in FIG. 14.

The above-described results are explained further by using the comparative example illustrated in FIG. 14 and FIG. 15. Note that, in FIG. 14 and FIG. 15, structures that are similar to those of the present embodiment are denoted by the same reference numerals. In this comparative example, in the inflated and deployed state of each of the front-rear extending portions 34A, the pair of long-side sewn portions S11, S12 are disposed so as to be aligned in the left-right direction. In the comparative example, the pair of front-rear extending portions 34A before inflation and deployment are folded up by external rolling in which the pair of long-side sewn portions S11, S12 are positioned at the respective sides in the axial direction. In the comparative example, because the pair of long-side sewn portions S11, S12 that have high rigidity are positioned at the respective axial direction sides of the external rolling, the rigidity of the pair of long-side sewn portions S11, S12 does not effectively contribute to the bending of the respective front-rear extending portions 34A in the vertical direction. Therefore, owing to the front-rear extending portions 34A bending in the vertical direction in the midst of inflation and deployment, there is the possibility that defective deployment of the airbag 32 may occur. However, this can be avoided in the present embodiment.

Further, in accordance with the present embodiment, at the time when the passenger D is restrained by the airbag 32, the pair of rear tethers 54, whose respective one end portions are sewn to the pair of front-rear extending portions 34A of the front-rear chamber 34 and whose respective another end portions are attached to the seatback 16 or to the vehicle body at further toward the seat rear side than the passenger D, pull the pair of front-rear extending portions 34A in toward obliquely rearward and downward sides of the seat. The pair of rear tethers 54 are stretched in the front-rear direction together with the front-rear chamber 34 at the time when the passenger is restrained by the airbag main body 40. These rear tethers 54, together with the front-rear chamber 34, receive and support the load that is applied from the passenger D to the airbag main body 40.

Moreover, due to the above-described pulling-in by the pair of rear tethers 54, swaying of the airbag 32 in the vertical direction and the front-rear direction at the time when inflation and deployment are completed can be suppressed. Moreover, due to the above-described pulling-in by the pair of rear tethers 54, the lower surfaces of the pair of front-rear extending portions 34A abut left and right shoulders K of the passenger D. Due thereto, the vertical direction position of the airbag main body 40 with respect to the head H of the passenger D can be stabilized, regardless of differences in physiques of the passengers D.

In the present embodiment, the front portion of the upper portion, which inflates and deploys at further toward the upper side than the front-rear chamber 34, of the airbag main body 40, and the pair of front-rear extending portions 34A of the front-rear chamber 34, are connected by the pair of front upper tethers 56, respectively. Due thereto, the airbag main body 40, which has inflated and deployed, being displaced (rotating) inadvertently toward the upper side around the connecting portion 34B with respect to the front-rear chamber 34 can be suppressed.

Moreover, in the present embodiment, the lower portion, which inflates and deploys at further toward the lower side than the front-rear chamber 34, of the airbag main body 40, and the pair of front-rear extending portions 34A of the front-rear chamber 34, are connected by the pair of front lower tethers 58, respectively. Due thereto, the airbag main body 40, which has inflated and deployed, being displaced (rotating) inadvertently toward the lower side around the connecting portion 34B with respect to the front-rear chamber 34 can be suppressed.

Figure 16:
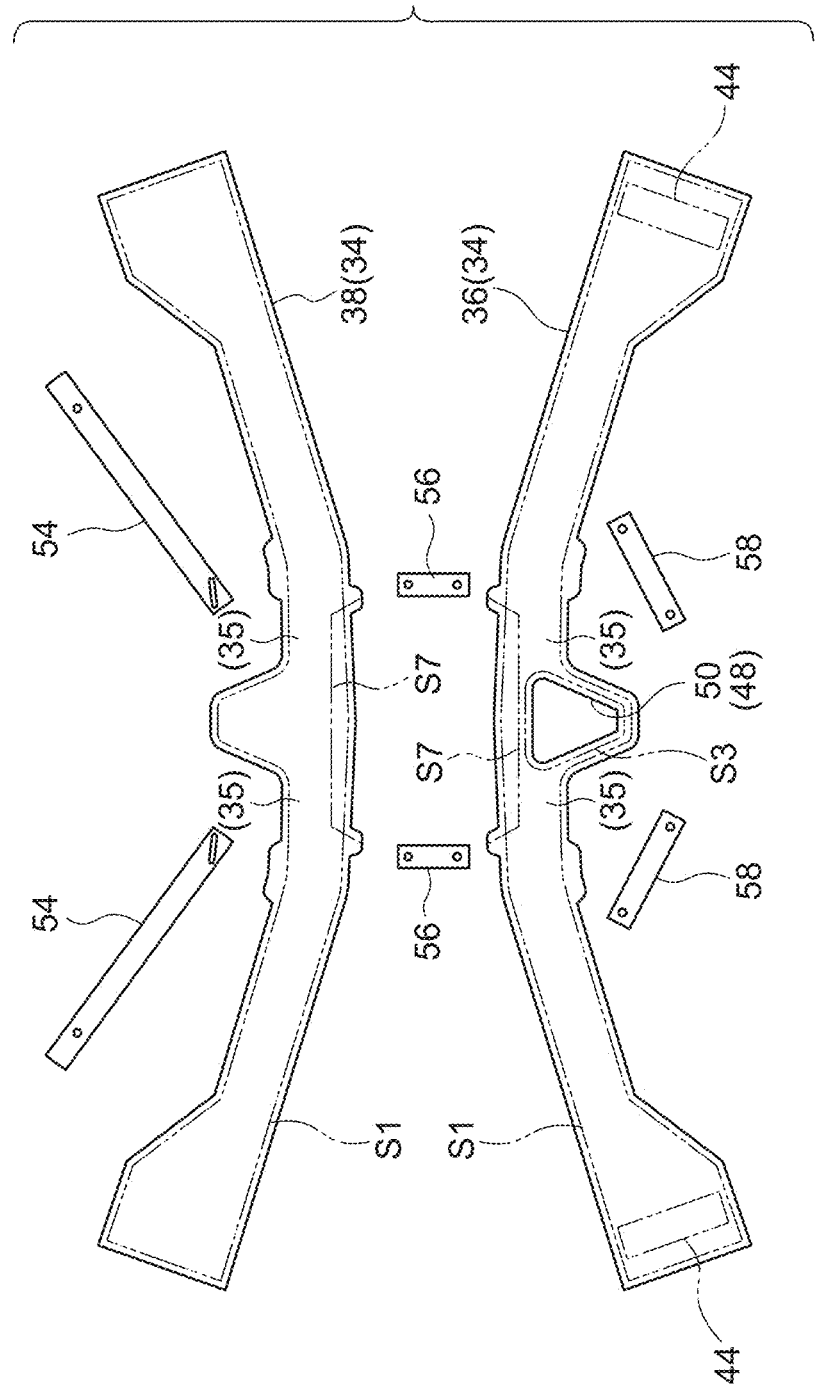
FIG. 16 is a deployed view illustrating a first modified example of the front-rear chamber.
Figure 17:
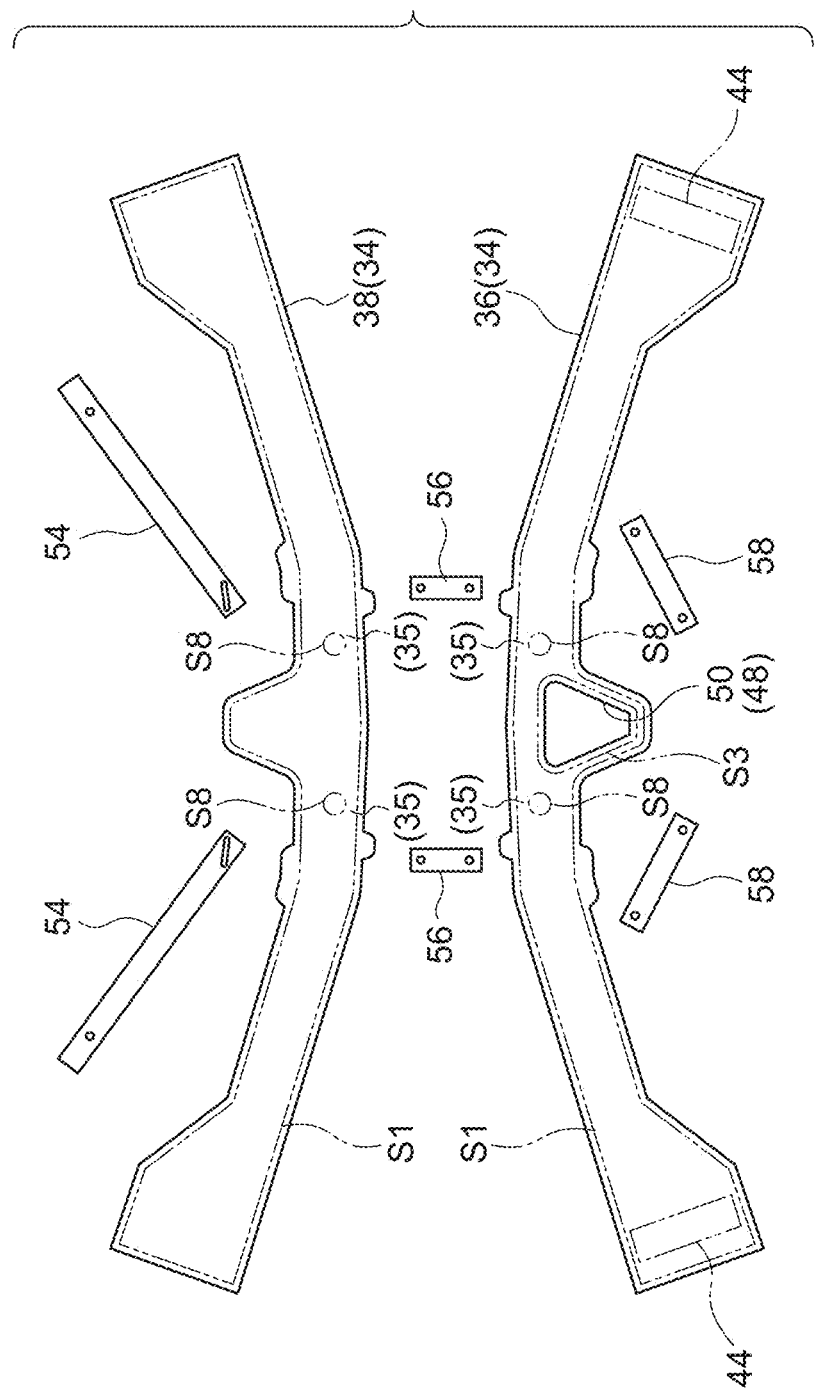
FIG. 17 is a deployed view illustrating a second modified example of the front-rear chamber.

A modified example of the above-described first embodiment is described next. A first modified example of the front-rear chamber 34 is illustrated in a deployed view in FIG. 16. In this first modified example, the pair of narrowing portions 35 are formed by the two base fabrics 36, 38 that structure the front-rear chamber 34 being sewn together at sewn portion S7 that is elongated and is shown in FIG. 16. A second modified example of the front-rear chamber 34 is illustrated in a deployed view in FIG. 17. In this second modified example, the pair of narrowing portions 35 are formed by the two base fabrics 36, 38 that structure the front-rear chamber 34 being sewn together at two sewn portions S8 that are formed like islands (are circular) and are shown in FIG. 17. Effects that are similar to those of the above-described first embodiment are obtained in the first modified example and the second modified example as well.

Figure 18:
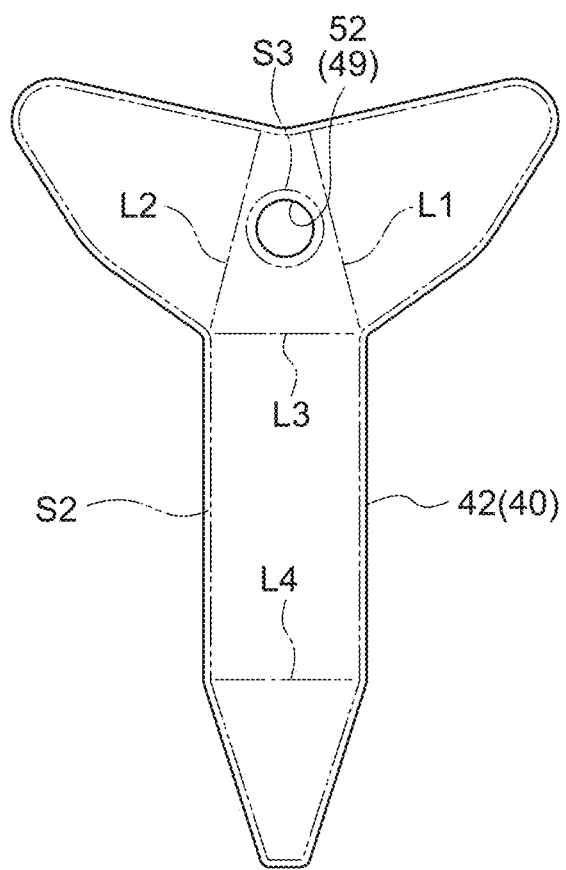
FIG. 18 is a deployed view illustrating a modified example of the airbag main body.

A modified example of the airbag main body 40 is illustrated in a deployed view in FIG. 18. In this modified example, a communication hole 49 of a small diameter is formed in the airbag main body 40. The opening surface area of this communication hole 49 is smaller than the opening surface area of the communication hole 48 in the first embodiment. The opening surface area of the communication hole 49 is smaller than the total of the internal sectional surface areas of the pair of front-rear extending portions 34A. Due thereto, even if the pair of narrowing portions 35 are not provided at the front-rear chamber 34, it is difficult for gas to flow from the front-rear chamber 34 to the airbag main body 40, and the inflation and deployment of the airbag main body 40 can be delayed. As a result, it is easy for the airbag main body 40 to pass through the gap G between the head H and the ceiling R. Moreover, because the timing of the deploying of the airbag main body 40 can be adjusted by appropriately sizing the communication hole 49, there is no need to add the sewn portions S4, S5, S6, S7 or S8 to the front-rear chamber 34, and an increase in the manufacturing cost is suppressed.

A second embodiment of the present disclosure is described next. Note that structures and operations that are basically similar to those of the first embodiment are denoted by the same reference numerals as in the first embodiment, and description thereof is omitted.

Second Embodiment

Figure 19:
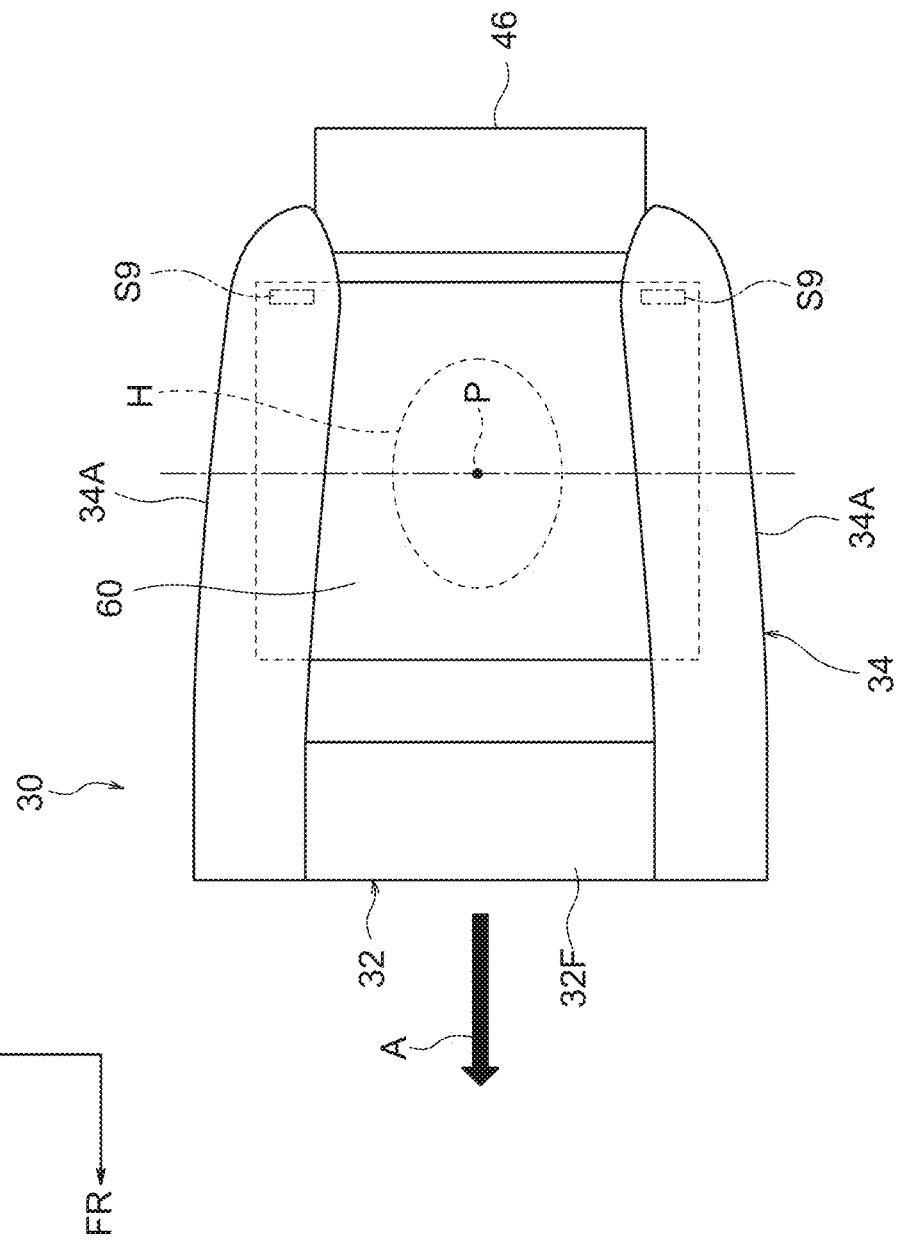
FIG. 19 is a plan view illustrating a state in the midst of inflation and deployment of an airbag in a passenger protection device relating to a second embodiment.
Figure 20:
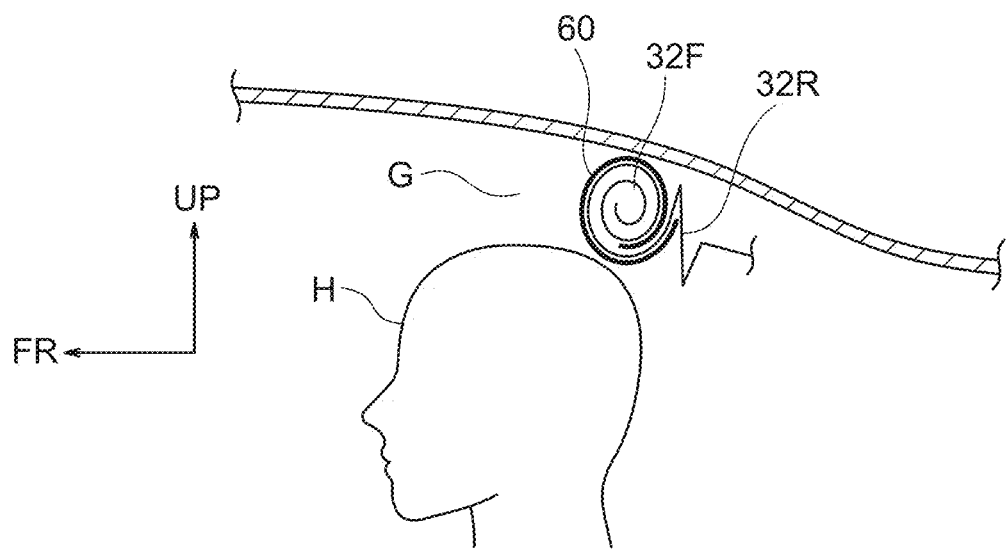
FIG. 20 is a side view illustrating a state in the midst of passage of the airbag, which is in the midst of inflation and deployment, through the gap between the head of the passenger and the ceiling of the vehicle, in the passenger protection device relating to the second embodiment.
Figure 21:
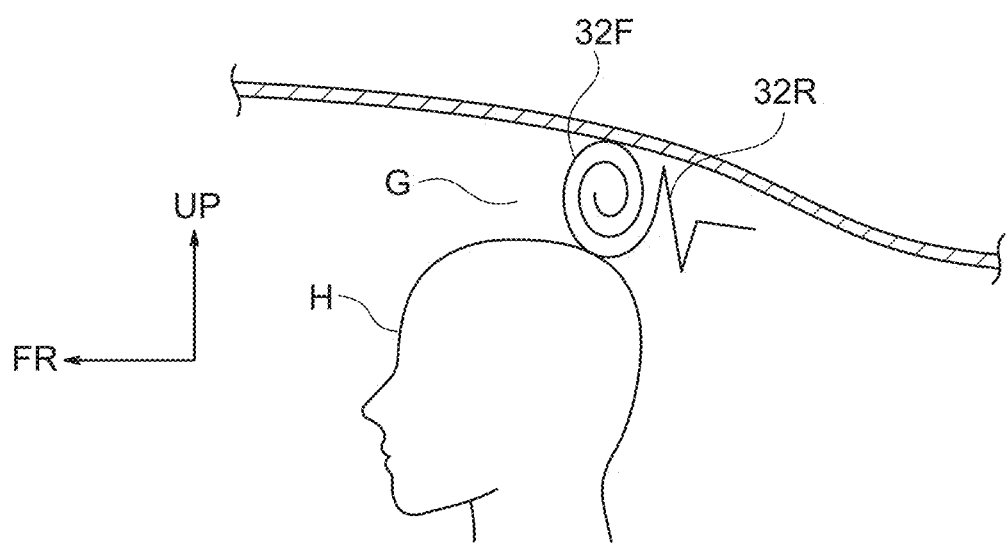
FIG. 21 is a side view illustrating a state in which an airbag, which is in the midst of inflation and deployment, becomes stuck in the gap between the head of the passenger and the ceiling of the vehicle, in a passenger protection device relating to a comparative example.

A state in the midst of inflation and deployment of the airbag 32 in a passenger protection device relating to a second embodiment of the present disclosure is illustrated in a plan view in FIG. 19. A state in the midst of the passage of the airbag 32, which is in the midst of inflating and deploying, through the gap G between the head H and the ceiling R in the passenger protection device relating to the second embodiment is illustrated in a schematic side view in FIG. 20. A state in which the airbag 32, which is in the midst of inflating and deploying, has become stuck in the gap G between the head H and the ceiling R in a passenger protection device relating to a comparative example is illustrated in FIG. 21. A side view for explaining rolling-up and corrugating of the airbag 32 in the passenger protection device relating to the second embodiment is illustrated in FIG. 22. Note that, in FIG. 19 and FIG. 22, arrow A indicates the deploying direction of the airbag 32.

As illustrated in FIG. 19, in the present embodiment, a guiding fabric 60, at which the coefficient of friction of the surface thereof is lower than those of the airbag 32 and the ceiling R, is attached to the pair of front-rear extending portions 34A of the front-rear chamber 34. An uncoated fabric for example is used as the guiding fabric 60. The guiding fabric 60 has a size such that, in a state in the midst of inflation and deployment of the airbag 32, the guiding fabric 60 extends between the pair of front-rear extending portions 34A, and extends at both sides in the front-rear direction with respect to peak portion P of the head H. The rear end portion of the guiding fabric 60 is sewn to the pair of front-rear extending portions 34A at a left and right pair of sewn portions S9. Note that illustration of the guiding fabric 60 is omitted in FIG. 22.

In this embodiment, the portion, which is at the front side and includes the airbag main body 40, of the airbag 32 before inflation and deployment is rolled-up (externally rolled), and the portion that is further toward the rear side than this externally rolled portion is corrugated, and the airbag 32 is accommodated within the module case 46. At the airbag 32 that is in the folded-up state, the above-described guiding fabric 60 is rolled-up together with a portion of the externally rolled portion. At the time of inflation and deployment of the airbag 32, as illustrated in FIG. 20, an externally rolled portion 32F passes through the gap G between the head H and the ceiling R, in a state in which the guiding fabric 60 is wound on the outer side of the externally rolled portion 32F. Due thereto, it is easy for the externally rolled portion 32F, which includes the airbag main body 40, to smoothly pass through the gap G. Therefore, as compared with the comparative example illustrated in FIG. 21, it is possible to prevent poor deployment of the airbag 32 due to the externally rolled portion 32F catching on the head H and the ceiling R and becoming stuck in the gap G. Note that reference numeral 32R in FIG. 20 and FIG. 21 indicates a corrugated portion.

Further, in accordance with this embodiment, the above-described guiding fabric 60 has a size such that, in a state in the midst of the inflation and deployment of the airbag 32, the guiding fabric 60 extends between the pair of front-rear extending portions 34A, and extends at both sides in the front-rear direction with respect to the peak portion P of the head H. Due thereto, at the time of inflation and deployment of the airbag 32, the guiding fabric 60 can be interposed stably between the ceiling R and the airbag 32, and between the airbag 32 and the head H.

Moreover, in accordance with this embodiment, the portion, which is at the front side and includes the airbag main body 40, of the airbag 32 before inflation and deployment is externally rolled, and the portion, which is further toward the rear side than the externally rolled portion, is corrugated. As illustrated schematically in FIG. 22, at the time of inflation and deployment of the airbag 32, the corrugated portion 32R of the airbag 32 inflates and deploys toward the front side first, and the externally rolled portion 32F including the airbag main body 40 is pushed-out toward the front side. As a result, it is easy for the externally rolled portion 32F including the airbag main body 40 to smoothly pass through the gap G between the head H and the ceiling R. Note that, in FIG. 22, the corrugated portion 32R deploys in the order of 32R1→32R2, and the rolled portion 32F deploys in the order of 32F1→32F2→32F3.

Although the present disclosure has been described above by exemplifying several embodiments and modified examples, the present disclosure can be implemented by being modified in various ways within a scope that does not depart from the gist thereof. The scope of the right of the present disclosure is, of course, not limited by the above-described respective embodiments and respective modified examples.

What is claimed is:

1. An airbag device, comprising:
an inflator configured to generate gas at a time of a collision of a vehicle; and
an airbag to which the gas is supplied, and that is configured to inflate and deploy from a seat rear side of an upper portion of a vehicle seat toward a seat front side,
wherein the airbag has:
a front-rear chamber having a left and right pair of front-rear extending portions that are configured to pass by respective left and right sides of a head of a passenger seated in the vehicle seat and inflate and deploy toward the seat front side, and a connecting portion connecting front end portions of the pair of front-rear extending portions in a seat left-right direction, the left and right pair of front-rear extending portions are only connected at the front end portions by the connecting portion; and
an airbag main body to which gas is supplied via a communication hole positioned at a seat rear side of the connecting portion of the front-rear chamber that has inflated and deployed, and that, owing to inflation and deployment of the front-rear chamber, is configured to pass through a gap between a ceiling of the vehicle and the head of the passenger from the seat rear side toward the seat front side, and thereafter, inflates and deploys toward the seat rear side.

2. The airbag device of claim 1, wherein narrowing portions, which reduce an internal sectional surface area of the connecting portion, are provided at the connecting portion of the front-rear chamber and further toward an upstream side of a flow of the gas than the communication hole.

3. A passenger protection device, comprising:
a vehicle seat configured to seat a passenger; and
the airbag device of claim 2, which is installed at a seat rear side of an upper portion of the vehicle seat.

4. The airbag device of claim 2, wherein the narrowing portions are formed by a left and right pair of sewn portions provided at the connecting portion.

5. The airbag device of claim 1, wherein an opening surface area of the communication hole is smaller than a total of internal sectional surface areas of the pair of front-rear extending portions.

6. A passenger protection device, comprising:
a vehicle seat configured to seat a passenger; and
the airbag device of claim 5, which is installed at a seat rear side of an upper portion of the vehicle seat.

7. The airbag device of claim 1, wherein:
the front-rear chamber is configured by pairs of long-side edge portions of two base fabrics, which are elongated and superposed together, being sewn together at a pair of long-side sewn portions,
the pair of front-rear extending portions before inflation and deployment are folded-up by being folded in a form of a roll in which the pair of long-side sewn portions are positioned at an outer periphery and an inner periphery, and
in inflated and deployed states of the respective front-rear extending portions, the pair of long-side sewn portions are disposed so as to be aligned in a seat vertical direction.

8. A passenger protection device, comprising:
a vehicle seat configured to seat a passenger; and
the airbag device of claim 7, which is installed at a seat rear side of an upper portion of the vehicle seat.

9. The airbag device of claim 1, comprising a guiding fabric attached to the pair of front-rear extending portions and at which a coefficient of friction of a surface thereof is lower than a coefficient of friction of the airbag, wherein:
a front-side portion, which includes the airbag main body, of the airbag before inflation and deployment is rolled up, and
at a time of inflation and deployment of the airbag, the rolled portion passes through the gap in a state in which the guiding fabric is wound on an outer side of the rolled portion.

10. The airbag device of claim 9, wherein a portion of the airbag before inflation and deployment, which portion is further toward a rear side than the rolled portion, is corrugated.

11. A passenger protection device, comprising:
a vehicle seat configured to seat a passenger; and
the airbag device of claim 10, which is installed at a seat rear side of an upper portion of the vehicle seat.

12. The airbag device of claim 9, wherein the guiding fabric has a size such that, in a state during inflation and deployment of the airbag, the guiding fabric extends between the pair of front-rear extending portions, and is configured to extend at both sides in a seat front-rear direction with respect to a peak portion of the head.

13. A passenger protection device, comprising:
a vehicle seat configured to seat a passenger; and
the airbag device of claim 12, which is installed at a seat rear side of an upper portion of the vehicle seat.

14. A passenger protection device, comprising:
a vehicle seat configured to seat a passenger; and
the airbag device of claim 9, which is installed at a seat rear side of an upper portion of the vehicle seat.

15. The airbag device of claim 9, wherein a rear end of the guiding fabric is sewn to the left and right pair of front-rear extending portions at a left and right pair of sewn portions.

16. A passenger protection device, comprising:
a vehicle seat configured to seat a passenger; and
the airbag device of claim 1, which is installed at a seat rear side of an upper portion of the vehicle seat.

17. The airbag device of claim 1, wherein the connecting portion is sewn to the airbag main body at a sewn portion provided at a central portion of the connecting portion, and the communication hole that connects the connecting portion and the airbag main body is formed at the inner side of the sewn portion.

18. The airbag device of claim 1, wherein an enlarged portion, whose dimension in a seat vertical direction is larger than that of both of a left end portion and a right end portion of the connecting portion, is provided at the left-right direction central portion of the connecting portion that has inflated and deployed, and the communication hole is formed in the enlarged portion.

19. An airbag device, comprising:
an inflator configured to generate gas at a time of a collision of a vehicle; and
an airbag to which the gas is supplied, and that is configured to inflate and deploy from a seat rear side of an upper portion of a vehicle seat toward a seat front side,
wherein the airbag has:
a front-rear chamber having a left and right pair of front-rear extending portions formed in elongated tube shapes that are configured to pass by respective left and right sides of a head of a passenger seated in the vehicle seat and inflate and deploy from the seat rear side of the upper portion of the vehicle seat continuously diagonally downward toward the seat front side, and a connecting portion connecting front end portions of the pair of front-rear extending portions in a seat left-right direction; and
an airbag main body to which gas is supplied via a communication hole positioned at a seat rear side of the connecting portion of the front-rear chamber that has inflated and deployed, and that, owing to inflation and deployment of the front-rear chamber, is configured to pass through a gap between a ceiling of the vehicle and the head of the passenger from the seat rear side toward the seat front side, and thereafter, inflates and deploys toward the seat rear side.

* * * * *